United States Patent
Xiao et al.

(10) Patent No.: US 9,344,438 B2
(45) Date of Patent: May 17, 2016

(54) SECURE NODE IDENTIFIER ASSIGNMENT IN A DISTRIBUTED HASH TABLE FOR PEER-TO-PEER NETWORKS

(75) Inventors: Lu Xiao, San Diego, CA (US); Vidya Narayanan, San Diego, CA (US); Edward Thomas Lingham Hardie, Menlo Park, CA (US); Ranjith S. Jayaram, San Diego, CA (US); Ramachandran Subramanian, San Diego, CA (US); Lakshminath Reddy Dondeti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1471 days.

(21) Appl. No.: 12/342,021

(22) Filed: Dec. 22, 2008

(65) Prior Publication Data

US 2010/0161817 A1 Jun. 24, 2010

(51) Int. Cl.
*G06F 15/16* (2006.01)
*H04L 29/06* (2006.01)
*H04L 29/08* (2006.01)

(52) U.S. Cl.
CPC .......... *H04L 63/126* (2013.01); *H04L 63/1458* (2013.01); *H04L 63/1466* (2013.01); *H04L 67/104* (2013.01); *H04L 67/1046* (2013.01);
(Continued)

(58) Field of Classification Search
USPC .......... 709/201–230; 370/254, 335, 338, 238; 705/49; 713/176; 726/7; 455/435, 414, 455/445, 433
See application file for complete search history.

(56) References Cited

U.S. PATENT DOCUMENTS

| | | | | |
|---|---|---|---|---|
| 7,643,458 | B1 * | 1/2010 | Talwar et al. | 370/338 |
| 7,664,107 | B2 * | 2/2010 | Chen et al. | 370/389 |
| 2003/0055892 | A1 * | 3/2003 | Huitema | H04L 29/06 |
| | | | | 709/204 |

(Continued)

FOREIGN PATENT DOCUMENTS

| CN | 1729645 A | 2/2006 |
|---|---|---|
| EP | 1655928 | 5/2006 |

(Continued)

OTHER PUBLICATIONS

International Search Report and Written Opinion—PCT/US2009/069113, International Search Authority—European Patent Office—Aug. 18, 2010.

(Continued)

*Primary Examiner* — Thomas Dailey
(74) *Attorney, Agent, or Firm* — Won Tae C. Kim

(57) ABSTRACT

A multi-party commitment method is provided whereby a joining node uses contributions provided by contributor nodes in a peer-to-peer overlay network to generate a node identifier. The joining node generates a first contribution and sends a join request to an introducer node (or a plurality of contributor nodes), where the join request seeks to obtain one or more contributions for generating the node identifier within an identifier space of the overlay network. A hash of the first contribution may be included as part of the join request. In response, the joining node may receive a plurality of contributions, wherein the contributions are bound to each other and the first contribution by a prior external multi-node commitment operation. The joining node can then generate its node identifier as a function of the first contribution and the received contributions. Consequently, collusion between nodes and malicious manipulation during ID generation can be frustrated.

64 Claims, 18 Drawing Sheets

(52) U.S. Cl.
CPC ....... *H04L 67/1057* (2013.01); *H04L 2463/142* (2013.01)

(56) References Cited

U.S. PATENT DOCUMENTS

| | | | | |
|---|---|---|---|---|
| 2004/0054807 | A1* | 3/2004 | Harvey | H04L 12/56 709/243 |
| 2004/0083368 | A1* | 4/2004 | Gehrmann | 713/171 |
| 2004/0210624 | A1* | 10/2004 | Andrzejak | H04L 29/06 709/201 |
| 2005/0177734 | A1* | 8/2005 | Tanimoto et al. | 713/186 |
| 2006/0021054 | A1* | 1/2006 | Costa | G06F 21/566 726/25 |
| 2006/0190715 | A1* | 8/2006 | Miller | H04L 9/0822 713/150 |
| 2007/0002869 | A1* | 1/2007 | Miller | 370/395.32 |
| 2007/0211405 | A1* | 9/2007 | Togashi | H01G 4/012 361/303 |
| 2008/0072037 | A1* | 3/2008 | Narayanan et al. | 713/156 |
| 2008/0120359 | A1* | 5/2008 | Murakami | 709/201 |
| 2008/0130516 | A1* | 6/2008 | You et al. | 370/254 |
| 2008/0137663 | A1 | 6/2008 | Gu et al. | |
| 2008/0288654 | A1* | 11/2008 | Matuszewski et al. | 709/238 |
| 2010/0064049 | A1* | 3/2010 | Magharei et al. | 709/229 |

FOREIGN PATENT DOCUMENTS

| | | |
|---|---|---|
| JP | 2003086233 A | 3/2003 |
| JP | 2004266796 A | 9/2004 |
| JP | 2006191489 A | 7/2006 |
| JP | 2007053452 A | 3/2007 |
| JP | 2007193626 A | 8/2007 |
| JP | 2007235243 A | 9/2007 |
| JP | 2009017069 A | 1/2009 |
| JP | 2010519630 A | 6/2010 |
| JP | 2011503936 A | 1/2011 |
| WO | WO2008102195 | 8/2008 |

OTHER PUBLICATIONS

Taiwan Search Report—TW098143725—TIPO—Jan. 11, 2013.

* cited by examiner

NODE ID VERIFICATION

US 9,344,438 B2

SECURE NODE IDENTIFIER ASSIGNMENT IN A DISTRIBUTED HASH TABLE FOR PEER-TO-PEER NETWORKS

BACKGROUND

1. Field

Various features pertain to wireless communication systems. At least one aspect pertains to methods for generating and/or assigning node identifiers in a peer-to-peer overlay network.

2. Background

Structured peer-to-peer networks use Distributed Hash Tables (DHT) for scalability and deterministic routing of queries. Distributed hash tables (DHTs) are a class of decentralized distributed systems that provide a lookup service similar to a hash table: (node name, identifier value) pairs are stored in the DHT, and any participating node can efficiently retrieve the identifier value associated with a given node name. Each node has a unique identity in the DHT and likewise each service or object stored in the network has a unique identity. All the identities are part of the same identifier space, which is usually very large to avoid collisions. Responsibility for maintaining the identities (e.g., mapping from node names to identifier values ID) is distributed among the nodes, in such a way that a change in the set of participating nodes causes a minimal amount of disruption. This allows DHTs to scale to extremely large numbers of nodes and to handle continual node arrivals, departures, and failures. DHTs form an infrastructure that can be used to build more complex services, such as distributed file systems, peer-to-peer file sharing and content distribution systems, cooperative web caching, multicast, anycast, domain name services, and instant messaging.

However, one weakness is that DHTs have no built-in mechanisms for access control. Any node may obtain multiple IDs (i.e., a Sybil attack where a node may forge multiple identities to subvert the security of a network), join the network in multiple places, and/or disrupt overlay routing, storage and other services. Consequently, malicious nodes may disrupt the efficient operation of DHT network topologies. If the fraction of malicious nodes is f, the probability that a given path in the overlay network is free of malicious nodes is $(1-f)^h$, where h is the path length. This decreases rapidly as the path length h increases, even if f (i.e., fraction of malicious nodes) is very small. For example, in a network of $2^{20}$ nodes (about 1 million nodes), if 3 percent of nodes are malicious, the probability that a given path of 20 hops is free of malicious nodes is about 54 percent.

It is plausible for adversaries to claim ownership of any node ID. Thus node identities must be independently verifiable by an impartial third party.

Additionally, DHTs are also vulnerable to chosen location attacks. Node identities are typically generated as follows: node ID=hash(random-input). An adversary may choose to join a specific region within the overlay network with a small amount of computational work by carefully choosing bits within the input. To join anywhere within a region of size $2^x$ in an overlay network of size $2^{160}$, the adversary would perform $O(2^{160-x})$ offline computations, where $O(f(x))$ denotes a computation complexity in the order of $f(x)$. Similarly, if uniform placement of nodes within an overlay network is assumed, the offline computational work needs to land between two selected nodes within an overlay network containing $2^m$ nodes is $O(2^m)$. In other words, even for a million-node network, the computational work needs to land between two chosen nodes is $2^{20}$ operations, which is not at all prohibitive. Current assumptions in employing cryptographic measures are to protect against an adversary who can perform $O(2^{128})$ offline computations and $O(2^{80})$ online computations.

Thus, chosen location attacks are quite feasible. A chosen location allows the adversary to take control over a region between two nodes or a region within the network. The adversary can then disrupt the communications of selected nodes or control access to objects and services that map to the location. In other words, the impact of chosen location attacks is also high. Given the feasibility and potential impact of these attacks, it is imperative that we protect against them.

In chosen location attacks, the adversary carefully selects bits in the random-input to obtain a desired node ID. Thus, the randomness of the input to the hash function must also be verifiable.

Consequently, a method is needed to prevent or minimize adversarial node attacks in an overlay network by safeguarding the node ID generation and/or assignment.

SUMMARY

A multi-party commitment method is provided whereby a joining node uses contributions provided by contributor nodes in a peer-to-peer overlay network to generate a node identifier for the joining node. The joining node generates a first contribution and sends a join request to an introducer node (or a plurality of contributor nodes), where the join request seeks to obtain one or more contributions for generating the node identifier within an identifier space of the overlay network. A hash of the first contribution may be included as part of the join request. In response, the joining node may receive a plurality of contributions, wherein the contributions are bound to each other and the first contribution by a prior external multi-node commitment operation. The joining node can then generate its node identifier as a function of the first contribution and the received contributions. In this manner, collusion between nodes can be prevented.

According to one feature, a method operational on a joining node is provided for generating a node identifier for a peer-to-peer overlay network. A first contribution is generated by the joining node. A first hash value may be generated by the joining node based on the first contribution, where the join request includes the first hash value that is used by a plurality of contributor nodes in calculating verification signatures. The joining node then sends a join request to an introducer node, where the join request seeks to obtain one or more contributions for generating the node identifier within an identifier space of the overlay network. Note that, the join request may include the first hash value of the first contribution, where the first hash value is subsequently provided to a plurality of contributor nodes and used in calculating verification signatures. In response, the joining node may receive a plurality of contributions from the introducer node, wherein the contributions are bound to each other and the first contribution by a prior external multi-node commitment operation. The contributions may one of either random or pseudorandom values. Additionally, the joining node may also receive a plurality of verification signatures from the introducer node, wherein each verification signature is a function of a plurality of commitment values generated by a plurality of contributor nodes, and the commitment values are a function of the contributions provided by the contributor nodes. Each verification signature may bind the commitment values, and consequently the contributions, together prior to each contributor node actually disclosing its contribution. The joining node may then generate the node identifier as a function of the first contribution and the received contributions. This node identifier may be distributed to one or more neighboring nodes in the overlay network, wherein the validity of the node identifier can be independently verified by the one or more neighboring nodes.

In one example, the joining node may be a network device comprising a contribution generator, a join request module, a contribution collection module, a node identifier generator, a hash generator, and/or a node identifier distribution module. The contribution generator may be configured to generate a first contribution. The hash generator may be adapted to generate a first hash value based on the first contribution, where the join request includes the first hash value that is used by a plurality of contributor nodes in calculating verification signatures. The join request module may be adapted to send a join request to an introducer node, where the join request seeks to obtain one or more contributions for generating the node identifier within an identifier space of an overlay network. The join request may include a first hash value of the first contribution, where the first hash value is provided to a plurality of contributor nodes and used in calculating the verification signatures. The contribution collection module may be adapted to receive a plurality of contributions from the introducer node, wherein the contributions are bound to each other and the first contribution by a prior external multi-node commitment operation. The contributions may be one of either random or pseudorandom values. The contribution collection module may be further configured to receive a plurality of verification signatures from the introducer node, wherein each verification signature is a function of a plurality of commitment values generated by a plurality of contributor nodes, and the commitment values are a function of the contributions provided by the contributor nodes. Each verification signature may bind the commitment values, and consequently the contributions, together prior to each contributor node actually disclosing its contribution. The node identifier generator may be adapted to generate a node identifier as a function of the first contribution and the received contributions. The node identifier distribution module may be adapted to distribute the node identifier to one or more neighboring nodes in the overlay network, wherein the validity of the node identifier can be independently verified by the one or more neighboring nodes.

According to another feature, a method operational on an introducer node is provided for assisting a joining node in generating a node identifier for a peer-to-peer overlay network. A join request is received from the joining node seeking to obtain one or more contributions for generating a new node identifier within an identifier space for the overlay network. The join request may include a first hash value of a first contribution, where the first hash value is provided to the contributor nodes and used in calculating the verification signatures. The introducer node may send a plurality of contribution requests to a plurality of contributor nodes in the overlay network. In one example, the number of contributor nodes to which the contribution requests are sent may be at least one more than a number of adversarial nodes in the overlay network. The contributor nodes to which the contribution requests are sent are one of either randomly or pseudo-randomly selected. In response, the introducer node may receive a plurality of commitment values from the contributor nodes, wherein each commitment value is a function of a corresponding contribution generated at each of the contributor nodes. The introducer node may then distribute the plurality of commitment values to the contributor nodes. In response, the introducer node may receive the plurality of contributions and corresponding verification signatures in response to distributing the plurality of commitment values, wherein each verification signature is a function of the plurality of commitment values. In one example, a contribution and verification signature pair may be received from each of the plurality of contributor nodes. The contributions may be one of either random or pseudorandom values. Each verification signature may also be a function of a first value from the joining node. Each verification signature may bind the commitment values, and consequently the contributions, together prior to each contributor node actually disclosing its contribution. The plurality of contributions may then be sent to the joining node, where the node identifier is generated by the joining node as a function of the contributions. Note that the commitment values and verification signatures may be verified prior to sending the contributions to the joining node. The verification signatures may also be sent to the joining node. The plurality of commitment values may be distributed directly by the contributor nodes to other contributor nodes.

Additionally, the number of contributor nodes to which the plurality of contribution requests are sent may be reduced, wherein the contributor nodes are a reduced set of nodes from a larger set of nodes in the peer-to-peer overlay network. The reduced set of nodes may be randomly selected so as to avoid the possibility of collusion among nodes. In one example, the random selection of contributor nodes may be based on a public key for the joining node. In another example, the random selection of contributor nodes may be based on a public key for the introducer node. In one instance, a value x is generated based on the public key for the introducer node, this value x is used to find a node $n_c$ that is responsible for that point for value x in the overlay network, the node $n_c$ is then used to determine a previous node $n_{c\text{-}prev}$ and a next node $n_{c\text{-}next}$ which are the predecessor and successor nodes to node $n_c$ in the overlay network respectively, where the previous node and next node are utilized as contributor nodes. In another instance, a value x is generated based on the public key for the introducer node and a first string, a value y is generated based on the public key for the introducer node and a second string, and a value z is generated based on the public key for the introducer node and a third string, the values x, y, and z are then used to find a plurality of nodes $n_X$, $n_Y$, and $n_Z$ that are responsible for the corresponding values x, y, and z in the overlay network, these plurality of nodes $n_X$, $n_Y$, and $n_Z$ are used as the contributors nodes.

In one example, the introducer node may be a network device comprising: a request receiver, a contribution request module, a commitment receiver, a commitment distribution module, a verification module, a contribution collection module, and/or a contribution distribution module. The request receiver may be adapted to receive a join request from a joining node seeking to obtain one or more contributions for generating a new node identifier within an identifier space for an overlay network. The join request may include a first hash value of a first contribution from the joining node, where the first hash value is provided to the contributor nodes and used in calculating the verification signatures. The contribution request module may be adapted to send a plurality of contribution requests to a plurality of contributor nodes in the overlay network. In one example, the number of contributor nodes to which the contribution requests are sent may be at least one more than a number of adversarial nodes in the overlay network. In another example, the contributor nodes to which the contribution requests are sent may be one of either randomly or pseudo-randomly selected. The commitment receiver may be adapted to receive a plurality of commitment values from the contributor nodes, wherein each commitment value is a function of a corresponding contribution generated at each of the contributor nodes. The commitment distribution module may be adapted to distribute the plurality of commitment values to the contributor nodes. Alternatively, the plurality of commitment values may be distributed directly by the contributor nodes to other contributor nodes. The contribution collection module may be adapted to receive the plurality of contributions and corresponding verification signatures in response to distributing the plurality of commitment values, wherein each verification signature is a function of the plurality of commitment values. The contribution collection module may also be adapted to receive a verification signature from each of the contributor nodes, wherein each verification signature is a function of the commitment values. Each verification signature is also a function of a first value from the joining node. Each verification signature may bind the commitment values, and consequently the contributions, together prior to each contributor node actually disclosing its contribution. The verification module may be adapted to verify the commitment values and verification signatures prior to sending the contributions to the joining node. The contribution distribution module may be adapted to send the plurality of contributions to the joining node, where a node identifier is generated by the joining node as a function of the contributions. The contributions may be one of either random or pseudorandom values. The contribution distribution module may further send the verification signatures to the joining node.

According to yet another feature, a method operational on a contributor node is provided for assisting a joining node in generating a node identifier for a peer-to-peer overlay network. The contributor node may receive a contribution request for a contribution, where the contribution request may include a hashed initial contribution from the joining node. A first contribution is then obtained or generated by the contributor node. The first contribution may be one of either a random or pseudorandom value. The contributor node may then generate a commitment value from the first contributions. The commitment value may be sent by the contributor node to at least one other contributor node. In one example, the commitment value is first sent to an introducer node that collects the commitment values and then distributes them to the contributor node. Other commitment values may be received from the at least one other contributor node. A verification signature may be generated by the contributor node based on the received commitment values and the hashed initial contribution. The verification signature binds the commitment values and hashed initial contribution, thereby allowing other nodes to subsequently verify the authenticity of the node identifier. The contribution node may then send the first contribution and/or the verification signature to the joining node after receiving the other commitment values, where the node identifier is generated by the joining node as a function of at least the first contribution and the initial contribution.

In one example, the contributor node may be a network device comprising: a contribution request receiver, a number generator, a commitment generator, a commitment distributor, a contribution collection module, a verification signature generator, and/or a contribution distribution module. The contribution request receiver may be adapted to receive a contribution request for a contribution, the contribution request including a hashed initial contribution from a joining node. The number generator may be adapted to obtain a first contribution. The commitment generator may be adapted to generate a commitment value from the first contribution. The commitment distributor may be adapted to send the commitment value to at least one other contributor node. The contribution collection module may be adapted to receive other commitment values from the at least one other contributor node. The verification signature generator may be adapted to generate a verification signature based on the received commitment values and the hashed initial contribution. The verification signature may bind the commitment values and hashed initial contribution, thereby allowing other nodes to subsequently verify the authenticity of the node identifier. The contribution distribution module for sending the first contribution and the verification signature to the joining node after receiving the other commitment values, where the node identifier is generated by the joining node as a function of at least the first contribution and the initial contribution.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

As used herein, the terms "identification", "identifier", and "ID" may be interchangeably used to refer to a value that serves to identify a particular node.

Overview

One feature provides a multi-party commitment method whereby a joining node uses random inputs provided by contributor nodes in the network to generate its node ID. To prevent collusion between the joining node and other nodes, an introducer node randomly selects which nodes are to act as contributor nodes for the joining node. The random inputs provided by the contributor nodes may be provided to all other contributor nodes so that all of the input contributions to the node ID are bound together, thereby preventing an adversarial joining node from trying to pick its own node ID. Subsequently, when the joining node seeks to be added to the overlay network, a verifier node can use the input contributions from the contributor nodes to verify whether the joiner's node ID is valid.

DHT Overlay Network

Within a communication network, each network device or node has an Internet Protocol (IP) address that is used to route messages to and/or from the network device. On top of such network IP layer, it is possible to implement an overlay network that uses a node identifier (i.e., Node ID) for each node. Consequently, even if the IP address for a node was to change, its Node ID remains the same for the overlay network. Thus, the overlay network does not rely on the IP layer infrastructure but instead uses Node IDs for peer-to-peer communications among its nodes. Additionally, such overlay network may implement Distributed Hash Tables across its nodes so that the overlay network is not crippled by any single point of failure.

Figure 1:
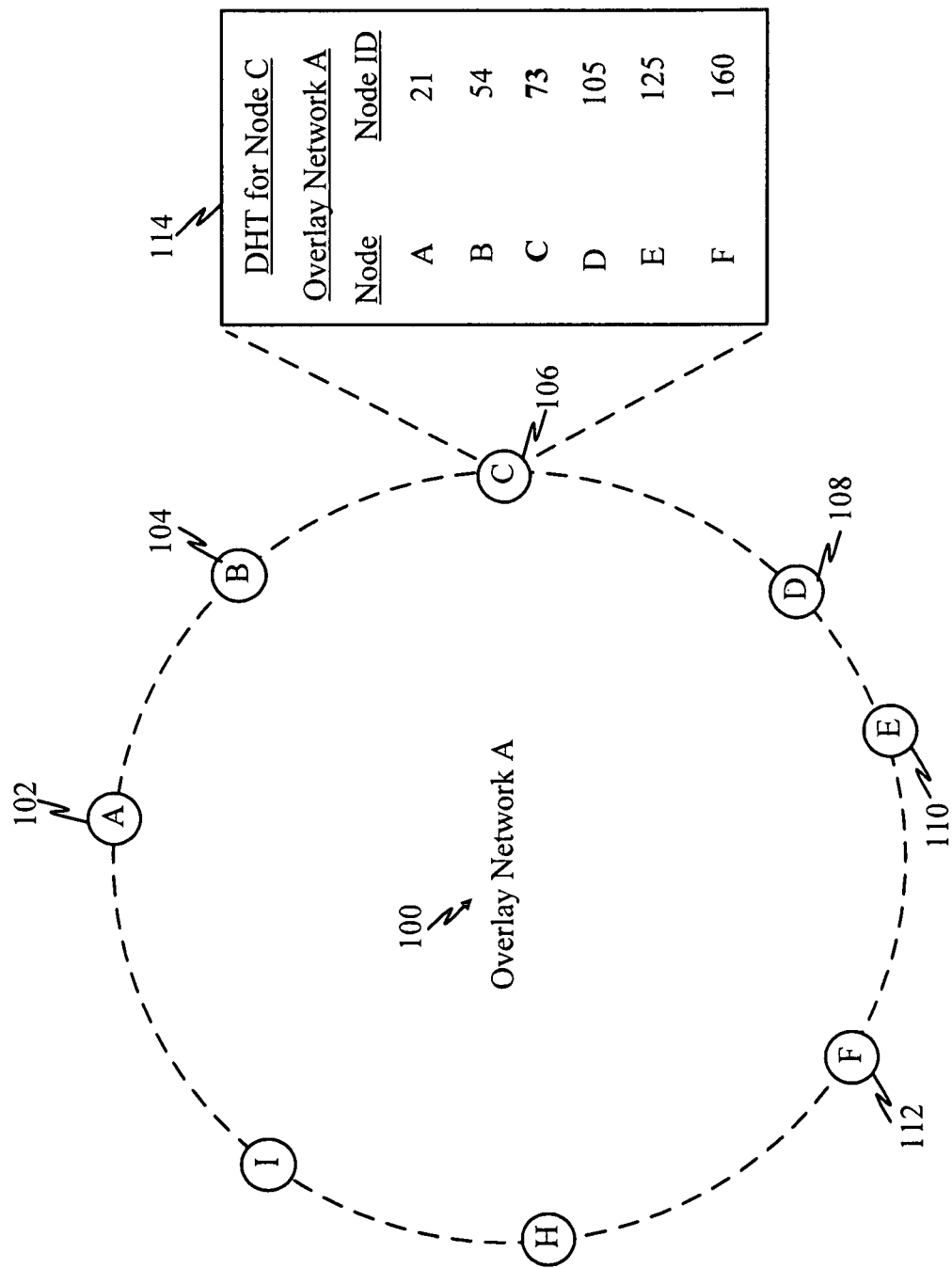
FIG. 1 is a diagram illustrating how a DHT may operate to facilitate the operation of a peer-to-peer overlay network.

FIG. 1 is a diagram illustrating how a DHT may operate to facilitate the operation of a peer-to-peer overlay network. While this example illustrates the overlay network as a ring, this is just for the sake of simplicity and other overlay network architectures are possible and contemplated. A peer-to-peer overlay network A 100 may be formed by a plurality of nodes A 102, B, 104, C 106, D 108, E 110, and/or F 112. Each node may maintain a portion of the DHT (e.g., node name, node identifier) for the overlay network A 100. Each node has a unique node identifier (Node ID) in the DHT 114 of overlay network 100, selected from an identifier space. Likewise, each service or object stored in the network 100 may have a unique identifier, also selected from the identifier space. All the Node IDs may be part of the same identifier space, which is usually very large to avoid collisions. Responsibility for maintaining the Node IDs (e.g., mapping from node names to node identifiers) is distributed among the nodes, in such a way that a change in the set of participating nodes causes a minimal amount of disruption. Each node may be responsible for a portion of the identifier space, typically starting from its own Node ID to the Node ID of one or more of its neighbors. The node may be responsible for storing objects and/or responding to queries for objects that map to any location within the range for which it is responsible. Each node may maintain a set of links to other nodes (its neighbors or routing table). Together, these links form the overlay network. A node picks its neighbors according to a certain structure, called the network's topology.

A cryptographic hash function may be used to assign identifiers (IDs) to nodes, objects and instances of services within the overlay network 100. Most DHTs use some variant of consistent hashing to map hash keys (i.e., identifiers) to nodes and/or services. This technique employs a function $\delta(k_1,k_2)$ which defines an abstract notion of the distance from key $k_1$ to key $k_2$, which is unrelated to geographical distance or network latency between nodes. Each node is assigned a single key called its identifier (i.e., Node ID). A node with identifier value (Node ID) i owns (or is responsible for) all the keys (or identifiers) for which identifier i is the closest ID, measured according to δ. DHT network topologies share some variant of the property that for any key k, the node either owns k or has a link to a node that is closer to k in terms of the keyspace distance defined above. It is then relatively simple to route a message to the owner of any key k (i.e., identifier) using a greedy algorithm. For example, at each node, a message is forwarded to the neighboring node who's Node ID is closest to key k. When there is no such neighbor (i.e., no other neighboring node has a closer Node ID), then it is assumed that the message has arrived at the closest node, which is the owner of key k as defined above. This style of routing is sometimes called key-based routing. In one example, DHT may treat keys as points on a circle (as illustrated in FIG. 1), and $\delta(k_1,k_2)$ is the distance traveling clockwise around the circle from $k_1$ to $k_2$. Thus, the circular keyspace is split into contiguous segments whose endpoints are the node identifiers (Node IDs). If $i_1$ and $i_2$ are two adjacent IDs, then the node with ID $i_2$ owns all the keys that fall between $i_1$ and $i_2$. Due to efficiency considerations in implementing this network topology, it may be advisable to guarantee that the maximum number of hops in any route (route length) is low, so that requests complete quickly; and that the maximum number of neighbors of any node (maximum node degree) is low, so that maintenance overhead is not excessive. Note that one tradeoff is that shorter routes require a number of neighbors for each node (i.e., higher maximum node degree).

In one example, node C 106 may maintain a DHT 114 in which it keeps the Node IDs for one or more predecessor nodes and one or more successor nodes. The DTH 114 may only a subset of all Node IDs, i.e., the Node IDs proximate to the Node ID for node C 106. For instance, DHT 114 for Node C 106 may maintain the preceding Node IDs for Nodes A 102 and B 104 and the succeeding Node IDs for Nodes D 108, E 110, and F 112. DHTs can scale to extremely large numbers of nodes (e.g., $2^{16}$ nodes in network 100) and are able to handle continual node arrivals, departures, and failures. In one example, the DHT may treat Node IDs as points on a circle, and $\delta(\text{Node IDi}_1, \text{Node IDi}_2)$ is the distance traveling clockwise around the circle (e.g., from Node C to some Node IDx). Thus, the circular identifier space is split into contiguous segments whose endpoints are the node identifiers (node IDs). If $i_1$ and $i_2$ are two adjacent node IDs, then the node with ID $i_2$ owns all the keys that fall between $i_1$ and $i_2$. Consequently, DHTs can form an infrastructure that can be used to build more complex services (e.g., distributed file systems, peer-to-peer file sharing and content distribution systems, cooperative web caching, multicast, anycast, domain name services, and instant messaging) where each such service may be associated with an identifier in the circular identifier space. The node having a node ID closest in value to a particular service identifier may be assumed to host such service (e.g., store a particular file or provide the service identified by the "service" identifier, etc.). For example, referring to DHT 114, if a service has an identifier value of "79", it is closest to the node ID "73" associated with Node C 106 and therefore, any request for such service would eventually end up at Node C 106.

Secure DHT Node ID Generation

Various methods for a DHT node identity generation are described herein to protect against various types of attacks to which conventional overlay networks may be susceptible. Generally, DHT node ID generation schemes described herein attempt to hinder or prevent such attacks by providing (a) uniform distribution of node IDs, (b) independent verification of node IDs, (c) randomness in generating node IDs, and/or (d) requiring proof of work done in generating a node ID.

Uniform Distribution of Node IDs—First, node IDs may be ideally generated so that they are uniformly distributed within a DHT. Node IDs generated using a cryptographic hash function generally satisfy this criterion. For example, use of a cryptographic hash function such as SHA-1 helps achieve random distribution of nodes around the DHT, assuming the input is random. Uniform distribution is desirable to ensure that nodes have approximately equal ownership of an id space within the overlay network. However, node departures (e.g., as when a mobile node moves to a different region) can disrupt uniform distribution of node IDs in a DHT and, consequently, this property may not always hold consistently.

Independent Verification of Node IDs—Second, node IDs may be independently verified. That is, a third party should be able to independently verify that the node ID indeed belongs to the node that claims the identifier. Additionally, it should be possible for any third party to derive the node ID from the inputs to a node ID derivation function. This allows the third party to verify the association of the inputs allegedly used to derive the node ID to the node that claims the node ID. To achieve such node ID verification, a node may generate an asymmetric key pair comprising a public key and a private key. The node can then use its public key as the input to the hash function to generate its node ID. The node can present a signature over its node ID as the proof of for verifying the Node ID. Such signature may be based on the node's private key. For another node to claim the same Node ID it would have the difficult task of generating another asymmetric key pair that has a public key which hashes to the same Node ID.

Unpredictably Random Node IDs—Third, the node IDs may be unpredictably random. This implies that it should be computationally difficult for a node to predict its ID within a DHT prior to joining the overlay network. For randomness of node IDs, either the input to the hash function or the node ID itself should be random or pseudorandom. There are two categories for such solutions: (a) ID assignment and/or a random input contribution by a trusted authority and/or (b) distributed node ID generation or distributed random input contribution by nodes within the overlay network.

Proof of Work in Generating Node IDs—Fourth, a node presenting a node ID may provide a proof of work done in generating the node ID. The proof of work may be computational. Alternatively, the proof of work can be associated with real-world credentials or relationships to make it more difficult for an attacking party or node to generate multiple node IDs within a DHT.

Node ID Assignment by a Trusted Authority (Registrar)

In this model of DHT node ID assignment, a trusted authority issues all of the node IDs within a DHT overlay network. All nodes contact the trusted authority to get a certified node ID. Verifiers (nodes of the DHT) only accept claims to node IDs that are signed by the trusted authority or a delegate thereof. The trusted authority may perform access control and/or rate limiting functions on node ID assignments to mitigate or slow down Sybil attacks. The trusted authority may be a centralized registrar or a set of distributed registrars.

Centralized Registrar

Figure 2:
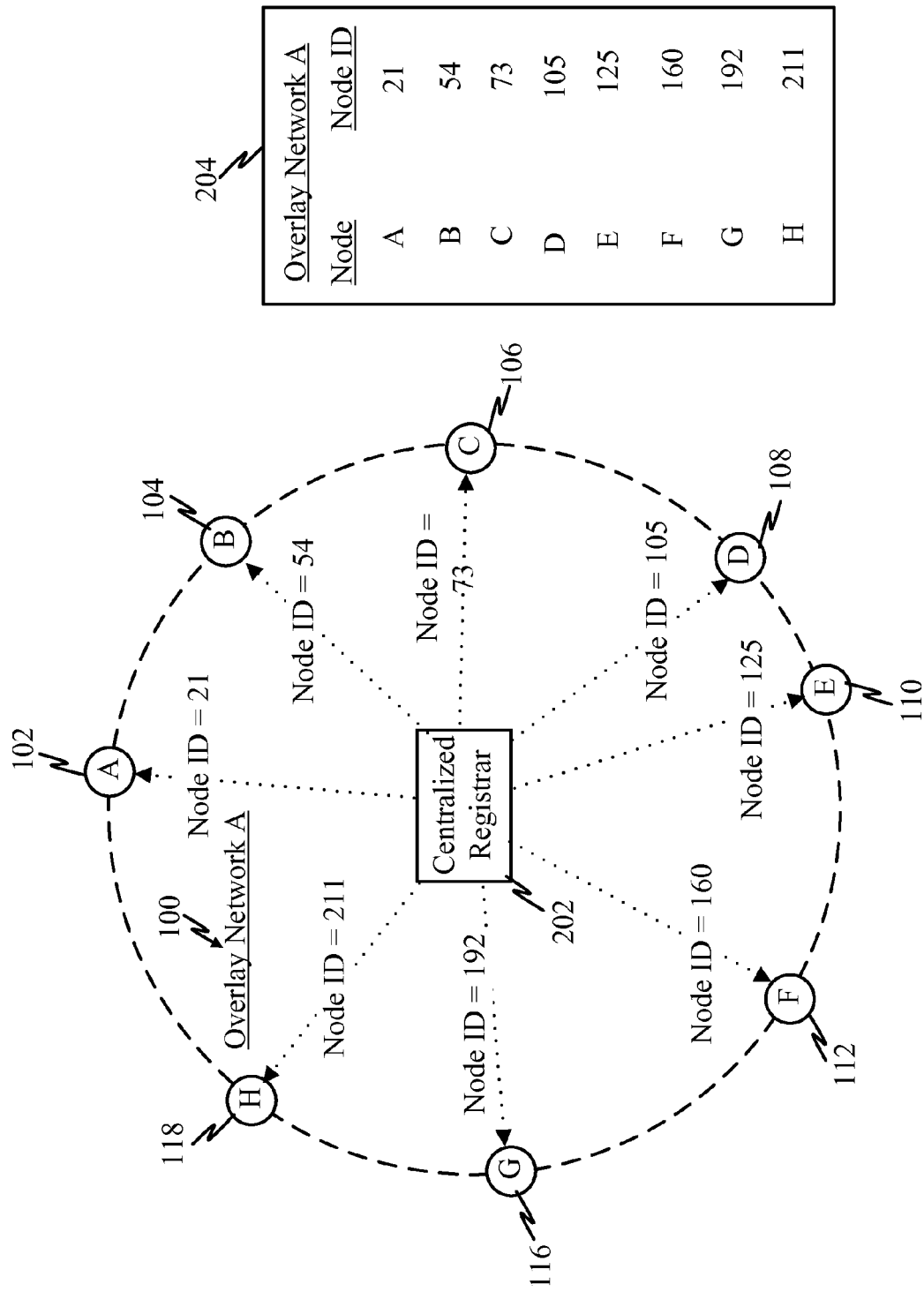
FIG. 2 is a block diagram illustrating how a centralized registrar (trusted authority) may serve to assign node IDs to a plurality of nodes within an overlay network.

FIG. 2 is a block diagram illustrating how a centralized registrar (trusted authority) may serve to assign node IDs to a plurality of nodes within an overlay network. For the overlay network 100, a centralized registrar 202 may serve to provide node IDs to the plurality of network nodes 102, 104, 106, 108, 110, 112, 116, and/or 118 to form a DHT 204. Each time a network node seeks to obtain a node ID, it sends a message to the centralized registrar 202 requesting an assignment of a node identifier. The centralized registrar 202 then computes a node ID for the requesting node, assigns it to the requesting node, and sends it to the requesting node.

In some implementations, the centralized registrar 202 may not participate in any overlay network operation and, as such, may not even be reachable for node ID verification by other nodes. One example of such centralized registrar 202 may include a certificate authority (CA) that receives public keys from requesting nodes, assigns node IDs, and asserts the mapping of the node IDs to the nodes. For instance, the certificate authority (CA) may sign a mapping of a node ID derived from the requesting node's public key. The requesting node can then present the certified node ID to other nodes and prove possession of the public key included in the certificate. The node can prove this possession by signing certain transmitted contents with its private key. Other nodes can verify the resultant signed content using the public key certified by the node's certificate. An overlay network specific centralized registrar may be deployed by creators of a given overlay network or entities interested in promoting the adoption of such overlay networks or it may also be provided by network operators.

One weakness in using a centralized registrar is that it may be difficult for all potential members (e.g., nodes) of a peer-to-peer overlay network to trust a single authority that owns and operates the centralized registrar. In some implementations, rather than the overlay network nodes relying completely on an external authority (i.e., centralized registrar) for node ID assignments, the centralized registrar 202 may instead provide a random input to the hash function with the node itself providing another random input to the hash function. Each of these two inputs would be used by a verifier node in verifying that a node ID belongs to the node that claims it.

Centralized registrars may restrict the number of node IDs that a single entity or node can obtain. For instance, in the case of an operator-owned centralized registrar, node IDs may be tied to service subscriptions. Alternatively, a node IDs may be tied to something of value, such as a credit card number. If a centralized registrar assigns a node ID without tying it to anything of value, or if the node IDs are only tied to non-valuable information (e.g., email addresses, IP addresses or MAC addresses, etc.), it makes it easier for an attacker to obtain several node IDs. This fosters Sybil attacks and allows an attacker to obtain several node IDs until a desired one is obtained.

Node Identity Generation by a Centralized Registrar

There are several ways in which a centralized registrar can generate and assign node IDs to nodes joining an overlay network.

Figure 3:
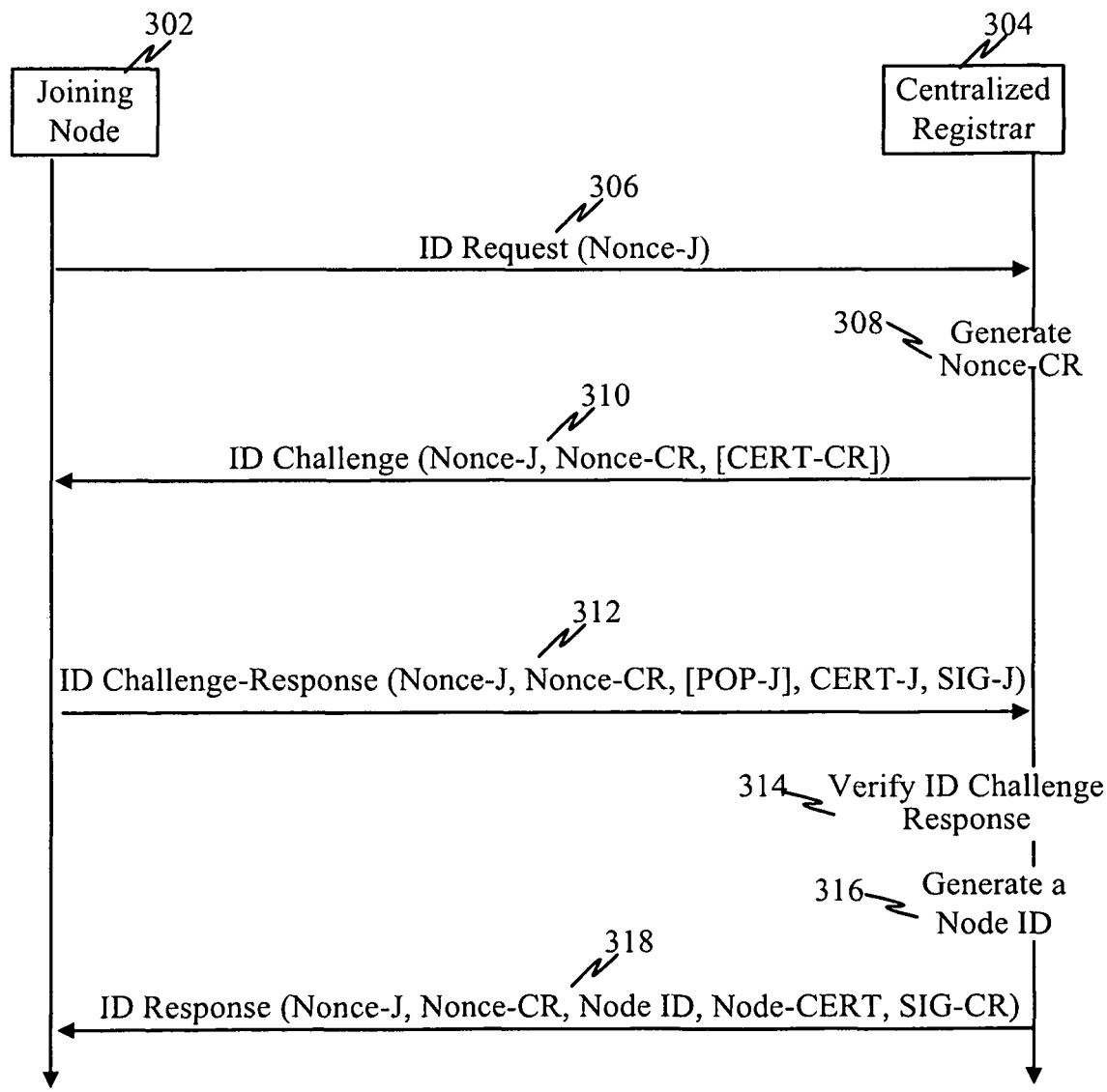
FIG. 3 is a diagram illustrating the generation and assignment of node IDs for a DHT of an overlay network by a centralized registrar.

FIG. 3 is a diagram illustrating the generation and assignment of node IDs for a DHT of an overlay network by a centralized registrar. In some cases, the node ID may be tied to a subscription, credit-card number or other legacy IDs or symmetric-key based credentials. In other cases, the node ID may be tied to a self-signed certificate. In all cases, it is assumed that the centralized registrar retains a record of the node ID assignments to ensure that it does not issue more node IDs than allowed by policy to each node (identified with credentials, credit-card number, and/or self-signed certificates).

To obtain a node ID, a joining node 302 sends a request for a node ID with a random first nonce (Nonce-J) 306 to the centralized registrar 304. In response to receiving the request, the centralize registrar 304 generates a second nonce (Nonce-CR) 308 and sends a node ID challenge to the joining node 302 with the received first nonce and the generated second nonce 310. In some implementations, the node ID challenge 310 may also include a public-key certificate (CERT-CR) for the centralized registrar 304. Note that, throughout this document optional content or operations may be demarked between brackets (i.e., as "[ . . . ]").

The joining node 302 then calculates and sends a challenge-response message 312 that includes the first and second nonces (Nonce-J and Nonce-CR), a proof-of-possession (POP) payload (POP-J), a node certificate (CERT-J) that can be signed by a centralized authority or self-signed, and message signature (SIG-J) over the entire message. The message signature (SIG-J), over the two nonces proves to the centralized registrar 304 that the joining node 302 has done an online or live calculation (thereby preventing attacks using offline calculations). The POP payload (POP-J) is optional but can be used by the joining node 302 to prove possession of a subscription based on shared keys or to present credit card information. To prove possession of a shared secret, the proof-of-possession payload (POP-J) uses a shared secret between the joining node and the centralized registrar before, e.g., a PIN (Personal Identity Number) provisioned during manufacturing or symmetric key negotiated through a public-key cryptographic exchange such as a Diffie-Hellman key exchange. The joining node 302 may compute a message authentication code (MAC) over the Node ID Challenge-Response using the shared secret in order to prove possession to the centralized registrar. To send credit card information, the joining node 302 may encrypt the information using the centralized registrar's public key (which may have been previously exchanged in a public key exchange). The message signature (SIG-J) may also prove the integrity of the message 312.

The centralized registrar 304 then verifies the challenge response 314. That is, the centralized registrar 304 may verify the challenge response 312 by verifying, for example, the joining node certificate CERT-J, the proof-of-possession POP-J, and/or message signature SIG-J. If the verification 314 is successful, the centralized registrar 304 may generate a Node ID 316 and send an ID response message 318 including the first and second nonces (Nonce-J and Nonce-CR), the new node identifier (Node ID), a certificate (Node-CERT) over the node ID and the joining node's public key and a signature (SIG-CR) over the entire message. The signature (SIG-CR) proves that the centralized registrar 304 is online or live when generating the Node ID and also establishes the origin of the message 318 to the joining node 302.

Random Input Contribution by a Centralized Registrar

Figure 4:
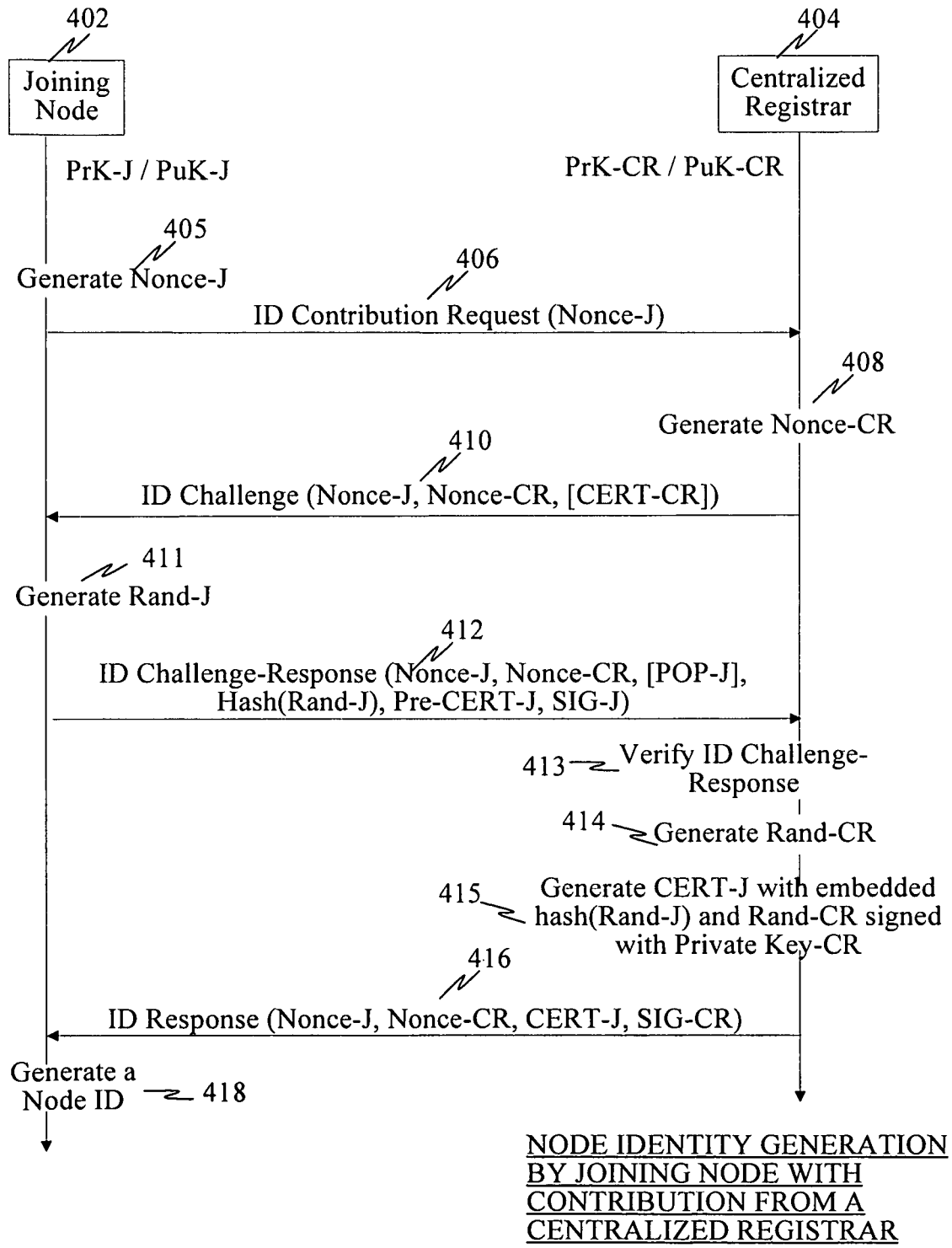
FIG. 4 is a diagram illustrating the generation and assignment of a node ID by a node joining an overlay network but with input from a centralized registrar.

In an alternative example, when nodes do not trust the centralized registrar, they may instead use a two-party commitment scheme to generate their own node ID but with input from the centralized registrar. FIG. 4 is a diagram illustrating the generation and assignment of a node ID by a node joining an overlay network but with input from a centralized registrar. In this model, neither party (node or centralized registrar) has control over the random input to the node ID generation function. The joining node 402 has an associated private key PrK-J and public key PuK-J while the centralized registrar 404 also has an associated private key PrK-CR and public key PuK-CR. The node generation function may be as follows: node ID=hash (PuK-J∥Rand-J∥Rand-CR), where PuK-J is the public key for the joining node, Rand-J is the joining node's input/contribution and Rand-CR is the centralized registrar's input/contribution. Rand-J is used for commitment and non-repudiation, where the hash(Rand-J) is signed by the centralized registrar before it knows the actual Rand-J value. This way, the joining node cannot change Rand-J after the centralized registrar signs hash(Rand-J). Nonce-J and Rand-J are generated by the joining device while Nonce-CR and Rand-CR are generated by the centralized registrar. The hash(Rand-J) and Rand-CR are embedded in a node certificate CERT-J, which is signed by the centralized registrar using its private key PrK-CR for future verification by others using the centralized registrar's public key PuK-CR.

To obtain a node ID, a joining node 402 generates a first nonce (Nonce-J) 405 and sends an ID Contribution Request with the first nonce (Nonce-J) 406 to the centralized registrar 404. In response to receiving the requested Contribution Request 406, the centralized registrar 404 may generate a second nonce (Nonce-CR) 408 and sends a node ID Challenge to the joining node 402 with the received first nonce (Nonce-J) and the generated second nonce (Nonce-CR) 410. In some implementations, the node ID Challenge 410 may also include a public-key certificate (CERT-CR) for the centralized registrar 404, containing the public key PuK-CR for the centralized registrar 404.

The joining node 402 then generates a random number, value, input, or contribution (RAND-J) 411 and sends an ID Challenge-Response message 412 that includes the first and second nonces (Nonce-J and Nonce-CR), a proof-of-possession (POP) payload (POP-J), a hash of the random input/contribution (hash(Rand-J)), a joining node pre-certificate (Pre-CERT-J) that includes its public key PuK-J, and a message signature (SIG-J). The Pre-CERT-J may (optionally) be signed by the joining node, e.g., using its private key PrK-J. The signature SIG-J over the two nonces (Nonce-J and Nonce-CR) proves to the centralized registrar 404 that the joining node 402 is online or live when SIG-J was generated. The POP payload (POP-J) is optional but can be used by the joining node 402 to prove possession of a subscription based on shared keys or present credit card information. To prove possession of a shared secret, the joining node 402 may compute a MAC over the ID Challenge-Response 412 using the shared secret. To send credit card information, the joining node 402 may encrypt the information using the centralized registrar's public key (which may have been previously provided by the centralized registrar 404). The joining node signature (SIG-J) may also prove the integrity of the message 412.

The centralized registrar 404 then verifies the challenge response 413. For instance, the centralized registrar 404 may verify the joining node's certificate Pre-CERT-J and/or the signature SIG-J. If the verification 413 is successful, the centralized registrar 404 then generates a random number, value, input, or contribution (Rand-CR) 414 and a joining node certificate (CERT-J) which may include the hash(Rand-J) and Rand-CR 415 and is signed with the centralized registrar's private key PrK-CR. An ID Response message 416 is sent including the first and second nonces (Nonce-J and Nonce-CR), the signed joining node certificate (CERT-J) over the hash(Rand-J) and/or Rand-CR, and a signature (SIG-CR) over the entire message. The signature (SIG-CR) proves that the centralized registrar 404 is online or live and also establishes the origin of the message 416 to the joining node 402. The joining node 402 then generates its Node ID 418 as a function of the first and second random numbers Rand-J and Rand-CR and the node's public key PuK-J (e.g., Node ID=hash (PuK-J||Rand-J||Rand-CR). That is, the joining node 402 can access the random input/contribution Rand-CR from the centralized registrar 404 by using the centralized registrar's public key PuK-CR on the received joining node certificate CERT-J.

Node Identity Verification

Once a node has obtained a Node ID, it can join the overlay network. To do this, it may send one or more requests to its neighboring nodes. Such requests are verified by the neighbor prior to allowing the requesting node to join.

Figure 5:
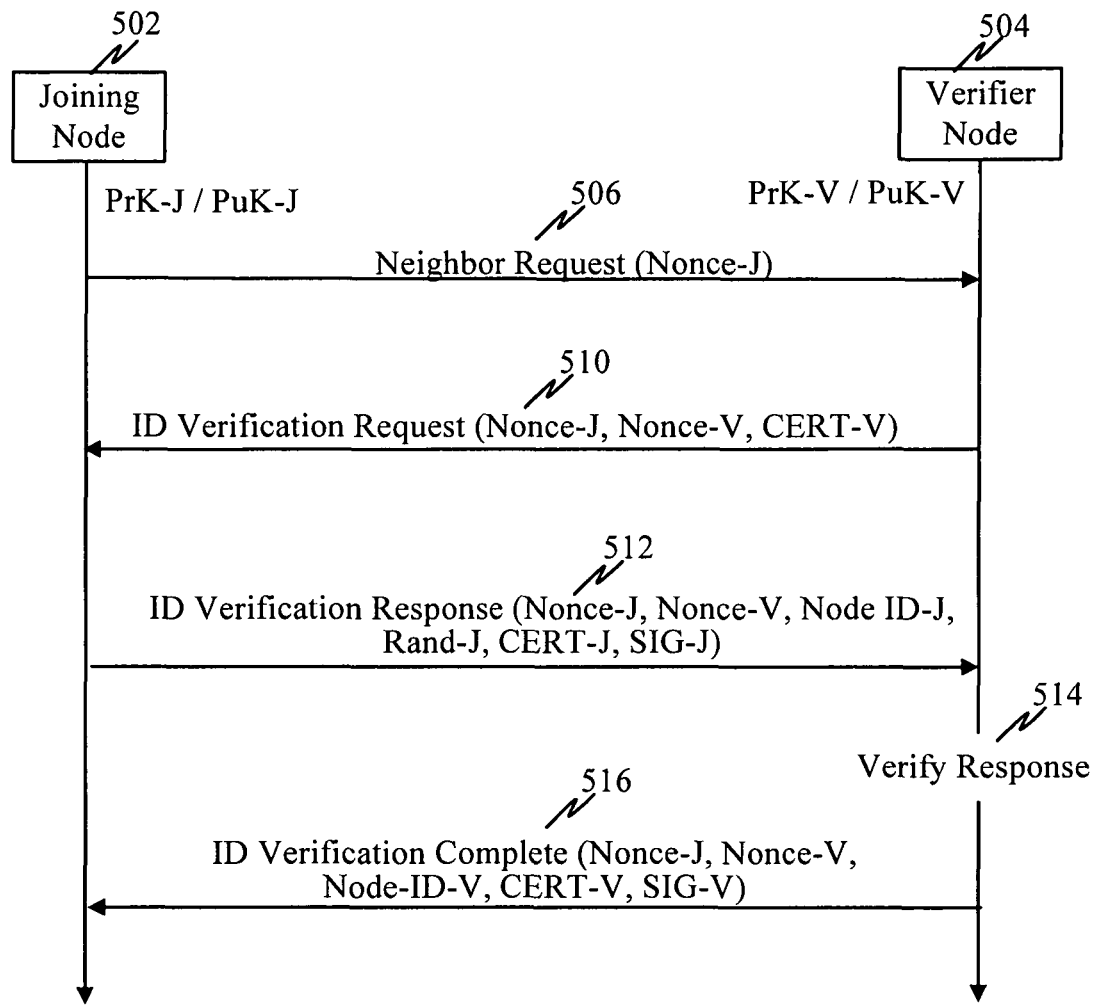
FIG. 5 is a diagram illustrating the verification of node IDs prior to allowing a joining node to join a DHT of an overlay network.

FIG. 5 is a diagram illustrating the verification of node IDs prior to allowing a joining node to join a DHT of an overlay network. The joining node 502 sends a request 506 to become a neighbor of the verifier 504. The "verifier" may be another node in the overlay network. Usually, such verification is triggered when a node tries to form a DHT neighbor relationship with another node. As part of the request 506 the joining node may send a first nonce (Nonce-J). It could send its certificate (CERT-J) as well, but the verifier 504 may want to be stateless at this stage. In response, the verifier 504 sends an ID verification request 510 with its own second nonce (Nonce-V) and verifier certificate (CERT-V), in addition to the received first nonce (Nonce-J). The joining node 502 then sends the first and second nonces (Nonce-J and Nonce-V), the joining node's ID (Node-ID-J), corresponding joining node's certificate (CERT-J) and signature (SIG-J) of the entire message 512. Inclusion of the first and second nonces (Nonce-J and Nonce-V) in the signature (SIG-J) proves that the joining node 502 is live and the signature (SIG-J) itself proves that the message 512 originated at the joining node 502. The joining node's certificate CERT-J has been previously signed by a centralized registrar with its private key PrK-CR and can be verified using the centralized registrar's public key PuK-CR which is known or obtainable by the Verifier node 504. The certificate CERT-J includes, at least, the random input Rand-CR from the centralized registrar which was used to generate the joining nodes identifier Node ID-J. In the case of verifying the node ID generated in FIG. 4, CERT-J also includes hash (RAND-J).

The verifier node 504 then verifies the response 514 by, for example, by validating the certificate CERT-J and signature SIG-J. Additionally, the verifier node 504 may verify the joining nodes ID (Node ID-J). To do this, the verifier node 504 uses Rand-J and Rand-CR (e.g., obtained from CERT-J) and computes the joining node ID and compares it to the received Node ID-J. Note that, the joining node's certificate CERT-J is signed by a trusted certificate authority (e.g., centralized registrar 404) so the verifier node 504 can extract data (e.g., Rand-CR) in CERT-J by using the centralized registrar's public key PuK-CR for verification. If the verification is successful (e.g., locally-generated Node ID-J =received Node ID-J), the verifier node 504 sends the two nonces (Nonce-J and Nonce-V), the verifier's node ID (Node-ID-V), corresponding verifier certificate (CERT-V), and signature (SIG-V) of the entire message 516. Note that the verification process may be mutual. A key management exchange can be piggybacked on the verification exchange. A Diffie-Hellman (DH) cryptographic exchange is one option. Another possibility might be for the two parties to send a secret to each other protected using the other's public key. The keys may be mixed to generate session keys.

The node joining process may generate only a few messages in the overlay network (other than the normal messaging to handle overlay routing state). The messaging for node joining is only for the node ID verification purposes and that can potentially be combined with the messaging used for creating routing state. In the best case scenario, this verification method adds no messages on top of overlay routing messages at the time a new node joins. In this case, the only overhead includes the verification of the signature of the centralized registrar. Additionally, the centralized registrar may be able to rate limit the joins by rate limiting the process of handing out node IDs. The centralized registrar may further employ policies to limit the number of node IDs given to any one entity (node). This may be done by tying the node ID distribution to some valuable information, such as network access subscriptions or credit card numbers.

However, one weakness with the centralized registrar model is its reliance on a centralized entity. The centralized registrar is a potential single point of failure. Additionally, some entity needs to own and operate the centralized registrar and it may be difficult to identify a single administrative entity that is widely acceptable to potential nodes. Limiting the node ID assignment using credit card numbers or subscriptions may be too restrictive for common, consumer overlay networks and is often impractical. It may be useful for creating more special-purpose overlay networks such as for restricted use, where the overlay identities can potentially be tied to other affiliations (e.g., employment, membership in an organization) and all the overlay participants are expected to be affiliated with the same or related entities. Another difficulty with using a centralized registrar is that its certificate (CERT-CR) must be pre-loaded on all the nodes of the overlay network.

Distributed Registrars

In a second overlay network model, some of the nodes in the peer-to-peer overlay network may act as distributed registrars for the overlay network and have the responsibility of assigning the node IDs in such a manner that the nodes are approximately uniformly distributed in the overlay network. The node ID assignment process is similar to that in the case of the centralized registrar (illustrated in FIG. 3).

Figure 6:
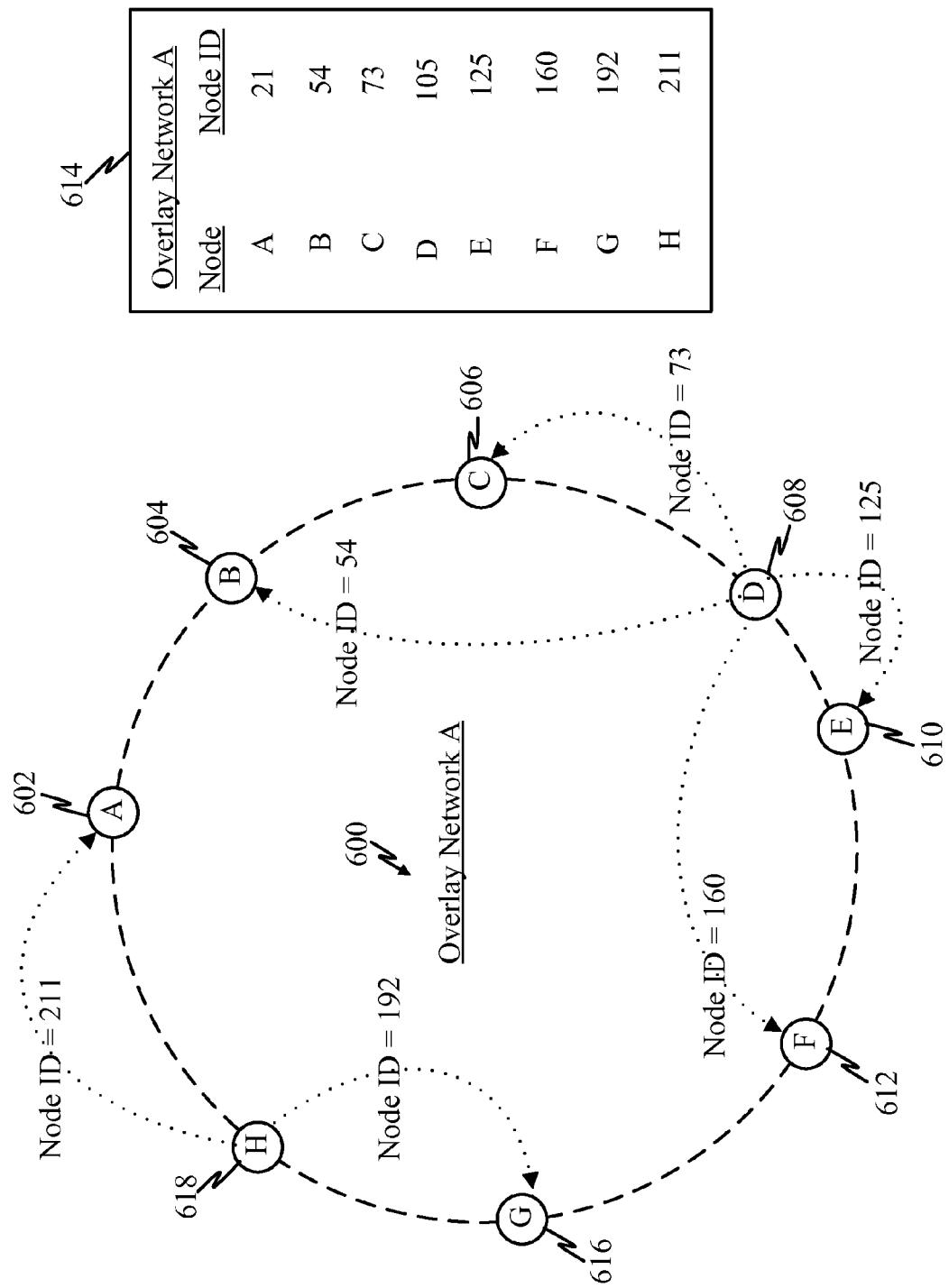
FIG. 6 is a diagram illustrating the generation and assignment of node IDs for a DHT of an overlay network by distributed registrars.

FIG. 6 is a diagram illustrating the generation and assignment of node IDs for a DHT of an overlay network by distributed registrars. In this example, joining nodes A 602, B 604, C 606, E 610, F 612, and G 618 may contact one of the distributed registrars (e.g., node D 608 and node H 618) and obtain a node ID. The distributed registrars (e.g., node D 608 and node H 618) may use a verification process as illustrated in FIG. 5.

There are at least two challenges in implementing a distributed registrar model. First, the distributed registrars (e.g., node D 608 and node H 618) assigning node IDs need coordination amongst themselves to ensure uniform distribution of nodes in the overlay network A 600. According to one approach, the ID space may be partitioned among the registrars so that each registrar is responsible for assigning node IDs from the ID space it owns. One disadvantage to this approach is that while the node IDs may be uniformly distributed within each registrar's ID space, it does not guarantee uniform distribution across the entire peer-to-peer overlay network 600. Uniform distribution across the entire overlay network 600 calls for some coordination in node ID assignment among the registrars themselves.

When there are a small number of these distributed registrars 608, 618 in the overlay network 600, it is possible that these are provided by some trusted authority. Hence, it is feasible to assume a higher level of trust for these nodes (registrars 608, 618) in comparison to the rest of the overlay network nodes.

As in the case of centralized registrar model, the node joining process is efficient, it involves only a four-way exchange for node ID generation and another for node ID verification. Trust relationships with the distributed registrars can be made reasonably straightforward such that the verification process is easier. Unlike the centralized registrar model, the distributed registrars are part of the overlay network and hence, the node joining process can happen irrespective of whether a joiner/verifier is attached to the Internet or not.

One difficulty with this distributed registrar model is that it again depends on the presence of special-purpose entities that are more trusted than other regular nodes. Depending on the type and purpose of an overlay network, this may or may not be feasible. Registrars need to be defined and deployed per overlay network and this could be a rather expensive mode of operation. Using just any node to assume registrar capabilities gets into trust management issues and hence, is not entirely viable. For uniform distribution of node ID within the DHT for the overlay network, coordination of node ID assignment in the overlay is needed. Such coordination may be difficult to do, especially with asymmetric join request loads handled by each distributed registrar and high rates of nodes joining the overlay network. Using this distributed registrar model to limit the number of node IDs handed to each entity or node is rather difficult since it requires coordination between registrars.

In alternative approach, all nodes start off with symmetric trust relationships. As nodes build up their reputation, some nodes get to function as registrars based on a reputation threshold set in the overlay network. Such registrar status may be withdrawn if the node's reputation drops below a certain threshold. Further, a registrar's reputation is distributed throughout the overlay network for verification of node IDs assigned by the registrars.

Distributed Node ID Generation

According to one aspect, node IDs may be generated using a well-known algorithm by a joining node itself but with input contributions from a plurality of other nodes in the overlay network. In this model, all nodes are considered equals from the point of view of ID space management.

Node ID Generation Using Multi-party Commitment

Figure 7:
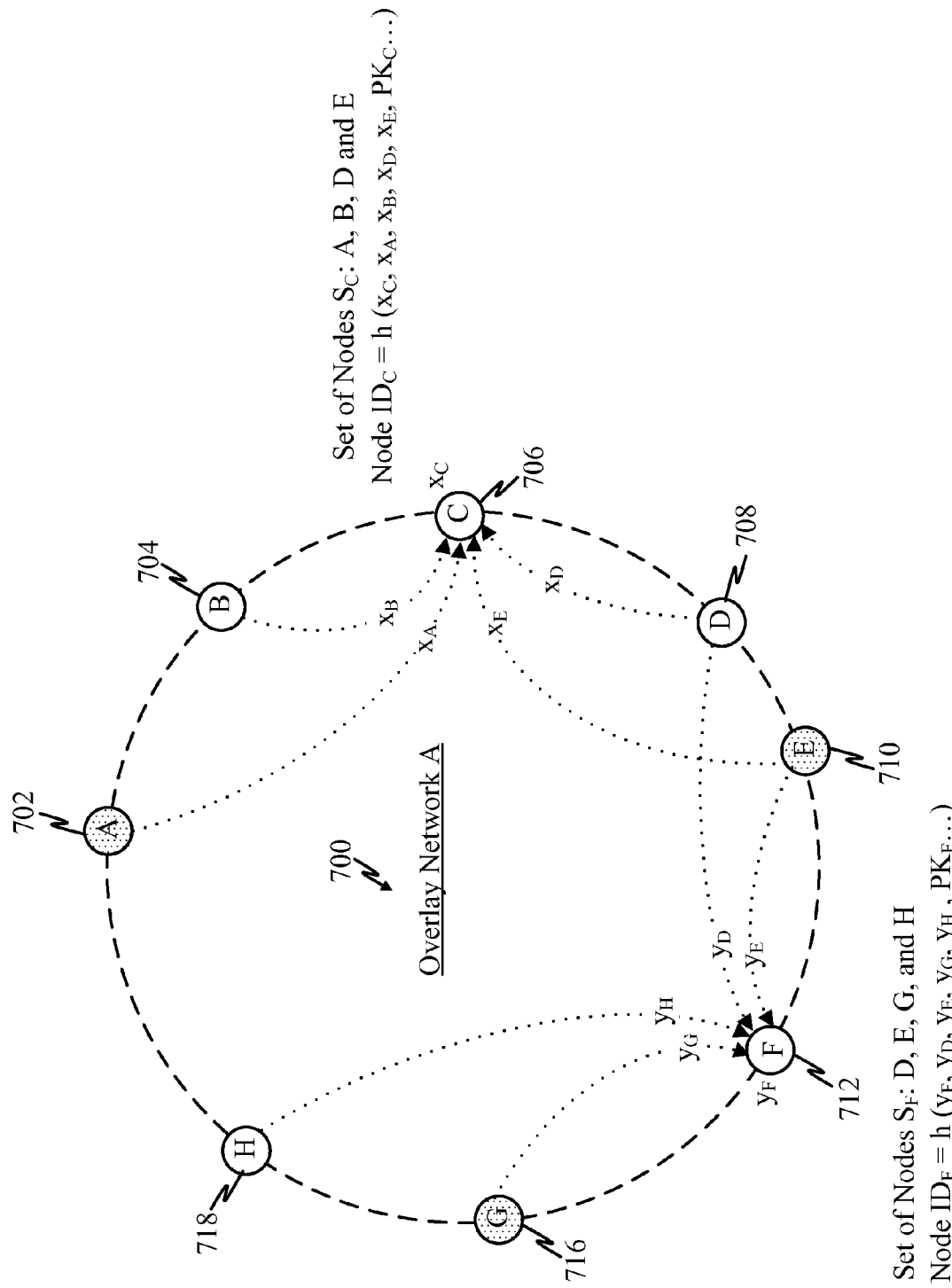
FIG. 7 is a diagram illustrating a multi-party commitment model where a Node ID may be generated by a joining node with a contribution or assistance from one or more other nodes in the overlay network.

FIG. 7 is a diagram illustrating a multi-party commitment model where a Node ID may be generated by a joining node with a contribution or assistance from one or more other nodes in the overlay network. In this example, nodes A 702, E 710, and G 716 may be colluding or adversarial nodes. The nodes C 706 and F 712 may be nodes that are attempting to join the overlay network 700. The joining node C 706 may commit to a random input $x_C$ and seeks random inputs $x_A$, $x_B$, $x_D$, and $x_E$ from a random set of nodes ($S_C$) (e.g., nodes A 702, B 704, D 708, and E 710) in the peer-to-peer overlay network 700. This set S includes at least one more node than the maximum number of adversarial nodes in the overlay network 700. In the case of set $S_C$, four inputs from other nodes (e.g., nodes A, B, D, and E) are chosen while the maximum number of adversarial nodes is three (nodes A, E and G). This ensures that there is at least one truly random input when calculating Node $ID_C$, even if all the rest of the nodes were colluding with the joining node C. The joining node's C public key PKc along with all the random numbers ($x_A$, $x_B$, $x_D$, and $x_E$) are inputs to the hash function h to generates the node $ID_C$ in the overlay network 700. Similarly, a second node F 712 may calculate its node $ID_F$ by selecting a random a random set of nodes ($S_F$) (e.g., nodes D 708, E 710, G 716, and H 718) to obtain random numbers ($y_D$, $y_E$, $y_G$, and $y_H$) and using its public key $PK_F$. Subsequently, a verifier can verify a node's ID by verifying all the contributory nonces from the nodes in S.

The set of contributing nodes S can be characterized as follows. It is assumed that there may be a fraction $f_1$ of adversarial nodes (e.g., node A, E, and G) in the overlay network 700. Therefore, the number of adversarial nodes is $f_1 *N$, where N is the total number of nodes in the overlay network 700. This implies that the set of contributing nodes S has at least $f_1 *N+1$ nodes.

The verification of a node ID may be an online process where a verifying node obtains the supposed inputs used to originally calculate the node ID and verifies that the node ID is the correct. However, at any given time some of the nodes may be offline (e.g., the node may be off). Assuming that, on average, a fraction $f_2$ of the nodes (i.e., out of the nodes that provided input numbers for calculating a node ID) will be offline at any one time, this implies that the size of the set S is at least $(f_1 *N+1)/f_2$ nodes to ensure online verifiability.

Figure 8:
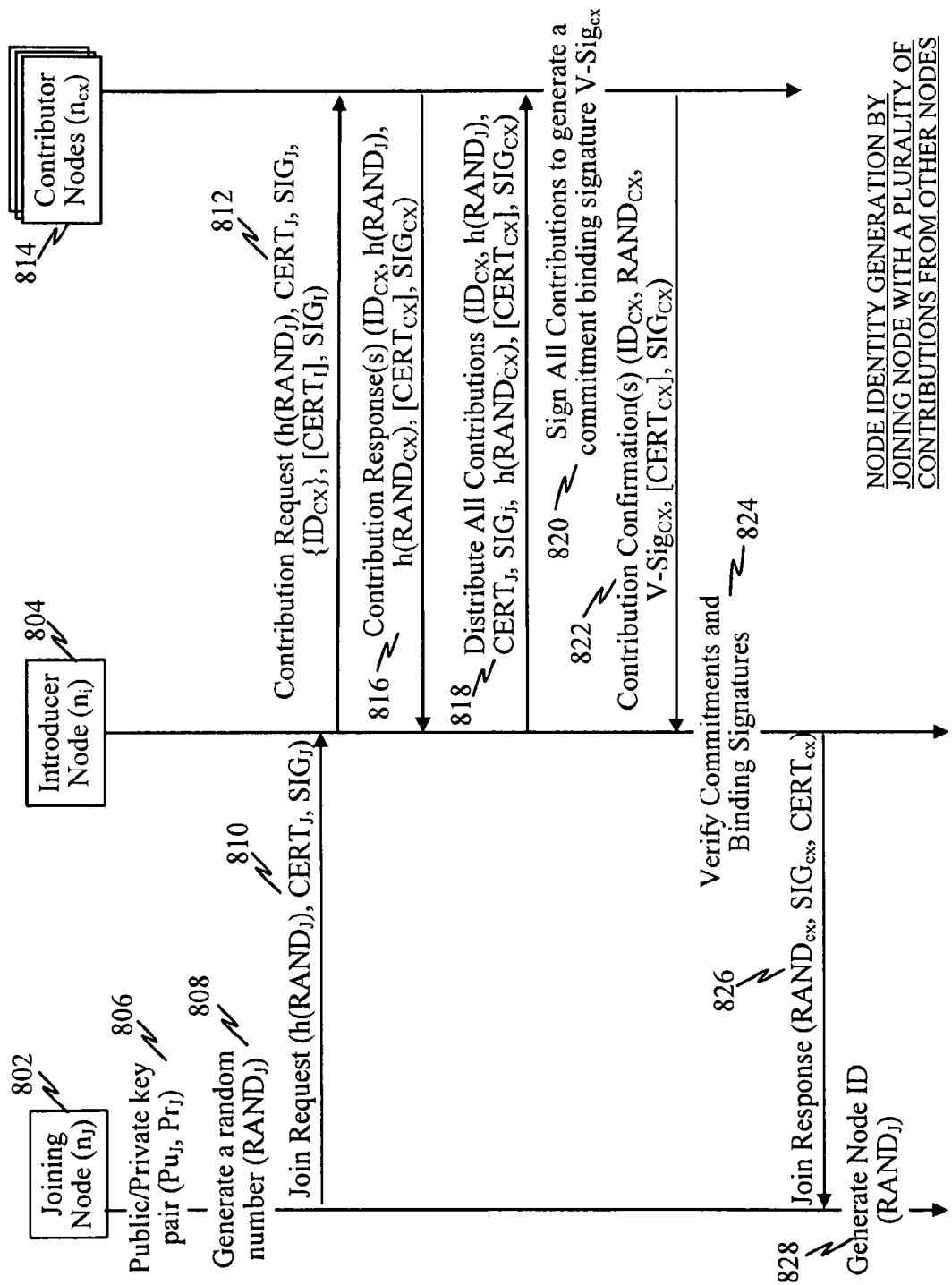
FIG. 8 is a diagram illustrating a multi-party commitment method where a Node ID may be generated by a joining node with a contribution or assistance from one or more other nodes in the overlay network.

FIG. 8 is a diagram illustrating a multi-party commitment method where a Node ID may be generated by a joining node with a contribution or assistance from one or more other nodes in the overlay network. Node $n_J$ 802 has a public/private key pair $(Pu_J, Pr_J)$ 806. Before requesting a node ID, node $n_J$ 802 generates a random number $(RAND_J)$ 808 that has at least as many bits as there are in the node ID. The joining node $n_J$ 802 then sends a join request 810, including a hash of the random number $h(RAND_J)$, a joining node certificate $CERT_J$ and, for security, may sign the join request message as well as a signature $(SIG_J)$, to an introducer node $n_I$ 804 (e.g., $n_J \rightarrow n_I$: Join Request $(h(RAND_J), CERT_J, SIG_J)$, where $CERT_J$ is a digital certificate of the joining node and contains its certified public key $Pu_J$). In one example, the join request message 810 may be signed using the joining node's private key $Pr_J$ and its public key $Pu_J$ is distributed so that the signed message can be verified by the receiving node. Such message signature $SIG_J$ may cover the hashed random number $h(RAND_J)$.

The introducer node $n_I$ 804 then sends a randomness contribution request 812 to |S|-1 randomly selected nodes $n_{CX}$ 814 in the overlay network, where the contribution request 812 includes the joining node's request message 810 $(h(RAND_J), CERT_J, SIG_J)$ after adding its own signature $SIG_I$ (e.g., $n_I \rightarrow n_{CX}$ for x={0, 1, . . . , |S-I1}: Contribution Request $(h(RAND_J), CERT_J, SIG_J, \{ID_{CX}\}, [CERT_I], SIG_I)$. The introducer node's signature $SIG_I$ should at least cover the hashed random number $h(RAND_J)$ and $\{ID_{CX}\}$, where $\{ID_{CX}\}$ is a list of node IDs associated with contributing nodes $n_{CX}$ for x={0, 1, . . . , |S|-1}. $CERT_I$ is the certificate of the introducer node $n_I$. Optionally, this certificate $CERT_I$ may be sent (denoted by "$[CERT_I]$") if a contributing node $n_{CX}$ does not know it otherwise. There may be alternative methods to obtain this certificate $CERT_I$, e.g., online search through X.500 directory service, etc.

The contributing nodes $n_{CX}$ 814 may send a contribution response message 816 with the original randomness contribution (hashed random number $h(RAND_J)$ from joining node), plus their own hashed randomness contribution (i.e., hashed random number $h(RAND_{CX})$), and sign the individual messages $SIG_{CX}$ (e.g., $n_{CX} \rightarrow n_I$ and $n_{CY}$, for $Y=\{0, 1, \ldots, |S|-1\}-\{X\}$: Contribution Response ($ID_{CX}$, $h(RAND_J)$, $h(RAND_{CX})$, [$CERT_{CX}$], $SIG_{CX}$), where $ID_{CX}$ is the node identifier for the contributing node $n_{CX}$, $CERT_{CX}$ is the certificate of the contributing node $n_{CX}$). Optionally, this node certificate $CERT_{CX}$ may include the public key for the contributing node $n_{CX}$ and may be sent (as denoted by [$CERT_{CX}$]) if the introducer node $n_I$ or other contributing nodes $n_{CY}$ do not know it otherwise. The signature $SIG_{CX}$ covers the whole contribution response except the contributing node certificate $CERT_{CX}$.

All the contribution responses 816 may be sent to all other contributors nodes $n_{CX}$ 814 and/or the introducer node $n_I$ 804. Alternatively, the contribution responses 816 may be sent to the introducer node $n_I$ 804 first, which then relays them 818 to all the contributor nodes $n_{CX}$ 814. This prevents some contributor nodes from receiving the contribution responses for other contributor nodes and using them to generate a particular contribution. Note that, at this point, none of the contributor nodes 814 have disclosed their random inputs $RAND_{CX}$, but instead have sent hashes of these random inputs (i.e., $h(RAND_{CX})$). This is so that all parties are bound (i.e., by commitment binding verification signatures $V\text{-}Sig_{CX}$) prior to actually disclosing the random inputs $RAND_{CX}$; thereby preventing colluding and/or adversarial nodes from subsequently changing their random inputs $RAND_{CX}$.

After receiving the S randomness contributions (e.g., $|S|-1$ from the contributor nodes 814 and one from the joining node 802), each of the contributor nodes $n_{CX}$ 814 computes a commitment binding verification signature $V\text{-}Sig_{CX}$ 820 by signing all the hashed random number contributions $h(RAND_{CX})$ including the joining node's contribution $h(RAND_J)$ and the hash of the joining node's public key $Pu_J$ (e.g., each node $n_{CX}$ computes multi-party commitment binding verification signature: $V\text{-}Sig_{CX}=SIG_{CX}(h(Pu_J)\|h(RAND_J)\|h(RAND_{C0})\|\ldots\|h(RAND_{C(|S|-1)}))$, where $SIG_{CX}(.)$ is a signing function using the private key $Pr_{CX}$ of the contributing node $n_{CX}$. These commitment binding verification signatures $V\text{-}Sig_{CX}$ may be referred to as multi-party (or multi-node) verification signatures and ensure that all the random number contributions (from the different contributor nodes) are tied to each other. These commitment binding verification signatures $V\text{-}Sig_{CX}$ are provided or distributed by all $|S|-1$ contributor nodes 814. All the contributor nodes 814 then send their contribution confirmations 822 including their input values $RAND_{CX}$ and commitment binding verification signatures $V\text{-}Sig_{CX}$ to the introducer node $n_I$ 804 (e.g., $n_{CX} \rightarrow n_I$, for $x=\{0, 1, \ldots, |S|-1\}$: Contribution Confirm ($ID_{CX}$, $RAND_{CX}$, $V\text{-}Sig_{CX}$, [$CERT_{CX}$], $SIG_{CX}$)). These messages 822 may be signed $SIG_{CX}$ (for protection) as with all other messages.

The introducer node 814 may verify the contribution responses 816 (using the received random inputs/contributions $RAND_{CX}$) and also verifies the binding signatures (i.e., verification signatures $V\text{-}Sig_{CX}$) 824 to ensure that the messages are compliant to the protocol. For instance, the introducer node 804 may verify that the received random inputs/contributions $RAND_{CX}$ are those used in each of the commitment binding verification signatures $V\text{-}Sig_{CX}$. After successful verification, the introducer node 804 may send a join response 826 including the random numbers $RAND_{CX}$ binding verification signatures $V\text{-}Sig_{CX}$ to the joining node 802 (e.g., $n_I \rightarrow n_J$: Join Response ({$ID_{CX}$, $RAND_{CX}$, [$CERT_{CX}$], $V\text{-}Sig_{CX}$}|$x=\{0, 1, \ldots, |S|-1\}$, [$CERT_J$], $SIG_I$) where "{f(x)}|$x=\{0, 1, \ldots, |S|-1\}$" denotes concatenation of $f(x)$ for $x=\{0, 1, \ldots, |S|-1\}$ in order). The joining node 802 then computes its own Node ID 828 based on its own random number $RAND_J$ and the contributed random numbers $RAND_{CX}$ (e.g., $n_J$ generates node $ID_J=h(Pu_J\|RAND_J\|RAND_{C0}\|\ldots\|RAND_{C(|S|-1)}))$.

Figure 9:
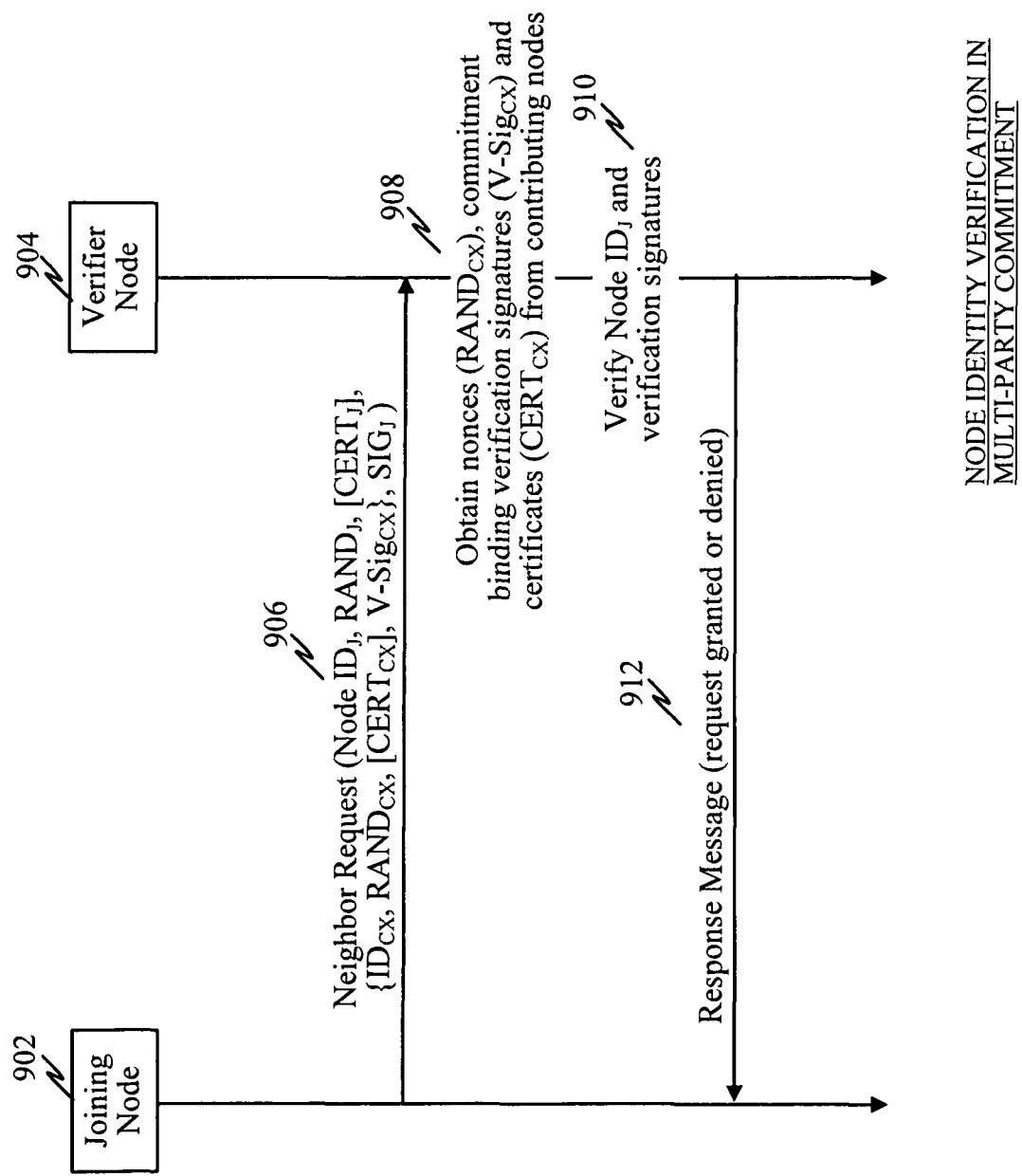
FIG. 9 is a diagram illustrating the verification of a node ID in a multi-party commitment model.

FIG. 9 is a diagram illustrating the verification of a node ID in a multi-party commitment model. Prior to verification, the joining node may have undergone a procedure (similar to FIG. 8) in which multiple other nodes contribute random numbers used by the joining node to generate its node ID. The joining node 902 sends a neighbor request 906 to the verifier node 904 (e.g., $n_J \rightarrow n_V$: Neighbor Request (Node $ID_J$, $RAND_J$, [$CERT_J$], {$ID_{CX}$, $RAND_{CX}$, [$CERT_{CX}$], $V\text{-}Sig_{CX}$}|$x=\{0, 1, \ldots, |S|-1\}$, $SIG_J$), where $RAND_J$, is the random input/contribution from the joining node, $ID_{CX}$ identify the other contributing nodes, $RAND_{CX}$ are the random inputs/contributions from the contributing nodes, and $V\text{-}Sig_{CX}$ are the commitment binding verification signatures from the contributing nodes). Usually, verification is triggered when a joining node tries to form a DHT neighbor relationship with another node (e.g., the verifier node 904). As part of the request 906 the joining node may send its node identifier Node $ID_J$, a first input/contribution $RAND_J$ (generated by the joining node and used for node ID generation), a plurality of contributor inputs/values $RAND_{CX}$, and the corresponding verification signatures $V\text{-}Sig_{CX}$ from the contributor nodes. The verifier node 904 may compute a local node identifier Node $ID_{LOCAL}=h(Pu_J\|RAND_J\|RAND_{C0}\|\ldots\|RAND_{C(|S|-1)})$ 908 and verifies that the received node identifier Node $ID_J$ is the same as the locally calculated node identifier Node $ID_{LOCAL}$ 910. Similarly, the verifier node 904 also verifies signatures $V\text{-}Sig_{CX}=Sig_{CX}(h(Pu_J)\|h(RAND_J)\|h(RAND_{C0})\|\ldots\|h(RAND_{C(|S|-1)}))$. If the received Node identifier Node $ID_J$ matches the locally computed node identifier Node $ID_{LOCAL}$ and the received verification signatures $V\text{-}Sig_{CX}$ can be successfully validated, then the response message 918 indicates that the neighbor request is granted; otherwise it is denied.

Optionally, the verifier node 904 may also contact some or all contributor nodes $n_{CX}$ to verify their presence. This may be done by using the contributor node identifiers $ID_{CX}$ to determine which nodes contributed to the node ID generation.

Table 1 summarizes the transactions of FIGS. 8 and 9 between a joining node $n_J$, an introducer node $n_I$, contributor nodes $n_{CX}$, and a verifier node $n_V$. It should be clear that for contributor nodes $n_{CX}$, $x=0, 1, \ldots, |S|-1$, and S is the set of selected contributor nodes. Additionally, each message may include a secure signature $SIG_K$ over the content of the message using the sending node's private key $Pr_K$. A receiving node can verify the content of the message using the sending node's public key $Pu_K$, which may be know or obtainable by the receiving node. Additionally, in Table 1 the joining node $n_J$ is used its public key $Pu_J$ (or derivative thereof) as its random input $RAND_J$ (used in FIGS. 8 and 9).

TABLE 1

| Node(s) | Operation |
| --- | --- |
| | Calculation of Node ID |
| $n_J$ | Generate public/private key pair $(Pu_J, Pr_J)$ |
| $n_J \to n_I$ | Join Request $(h(RAND_J), CERT_J, SIG_J)$ where $CERT_J$ contains $Pu_J$ |
| $n_I \to n_{CX}$ | Contribution Request $(h(RAND_J), CERT_J, SIG_J, \{ID_{CX}\}, [CERT_I], SIG_I)$ |
| $n_{CX} \to n_I, n_{CY}$ | Contribution Responses $(ID_{CX}, h(RAND_J), h(RAND_{CX}), [CERT_{CX}], SIG_{CX})$, where $n_{CY}$ are the other contributing nodes. |
| $n_{CX}$ | Compute Verification Signature $V\text{-}Sig_{CX} = SIG_{CX}(h(Pu_J) \| h(RAND_J) \| h(RAND_{C0}) \| \ldots \| h(RAND_{C(|S|-1)}))$ |
| $n_{CX} \to n_I$ | Contribution Confirmations $(ID_{CX}, RAND_{CX}, V\text{-}Sig_{CX}, [CERT_{CX}], SIG_{CX})$ |
| $n_I \to n_J$ | Join Response $(\{ID_{CX}, RAND_{CX}, [CERT_{CX}], V\text{-}Sig_{CX}\} \mid x = \{0, 1, \ldots, |S|-1\}, [CERT_I], SIG_I)$ |
| $n_J$ | Generate node $ID_J = h(Pu_J \| RAND_J \| RAND_{C0} \| \ldots \| RAND_{C(|S|-1)})$ |
| | Verification of Node ID |
| $n_J \to n_V$ | Neighbor Request $(ID_J, RAND_J, [CERT_J], \{ID_{CX}, RAND_{CX}, [CERT_{CX}], V\text{-}Sig_{CX}\} \mid x = \{0, 1, \ldots, |S|-1\}, Sig_J)$ |
| $n_V$ | Compute local node $ID_{Local} = h(Pu_J \| RAND_J \| RAND_{C0} \| \ldots \| RAND_{C(|S|-1)})$; Compare node $ID_{Local}$ and node $ID_J$ |
| $n_V$ | Verify a sufficient number of signatures $V\text{-}Sig_{CX} = SIG_{CX}(h(h(Pu_J) \| h(RAND_J) \| h(RAND_{C0}) \| \ldots \| h(RAND_{C(|S|-1)})))$ |
| $n_V \to n_{CX}$ | Ensure presence of contributor nodes $n_{CX}$ |
| $n_V \to n_J$ | Verification Successful Message; Add $n_J$ to routing table. |

This multi-party commitment method is completely decentralized and does not rely on any special trusted entities. It ensures the same level of identity strength as in the case of centrally assigned node IDs. All nodes are treated equal from a trust perspective and hence, this method handles various kinds of true peer-to-peer overlay networks. Threats from adversarial nodes (e.g., colluding nodes) are thwarted, as long as the fraction of adversaries in the network does not exceed the number of contributing nodes.

Example of Joining Node

Figure 10:
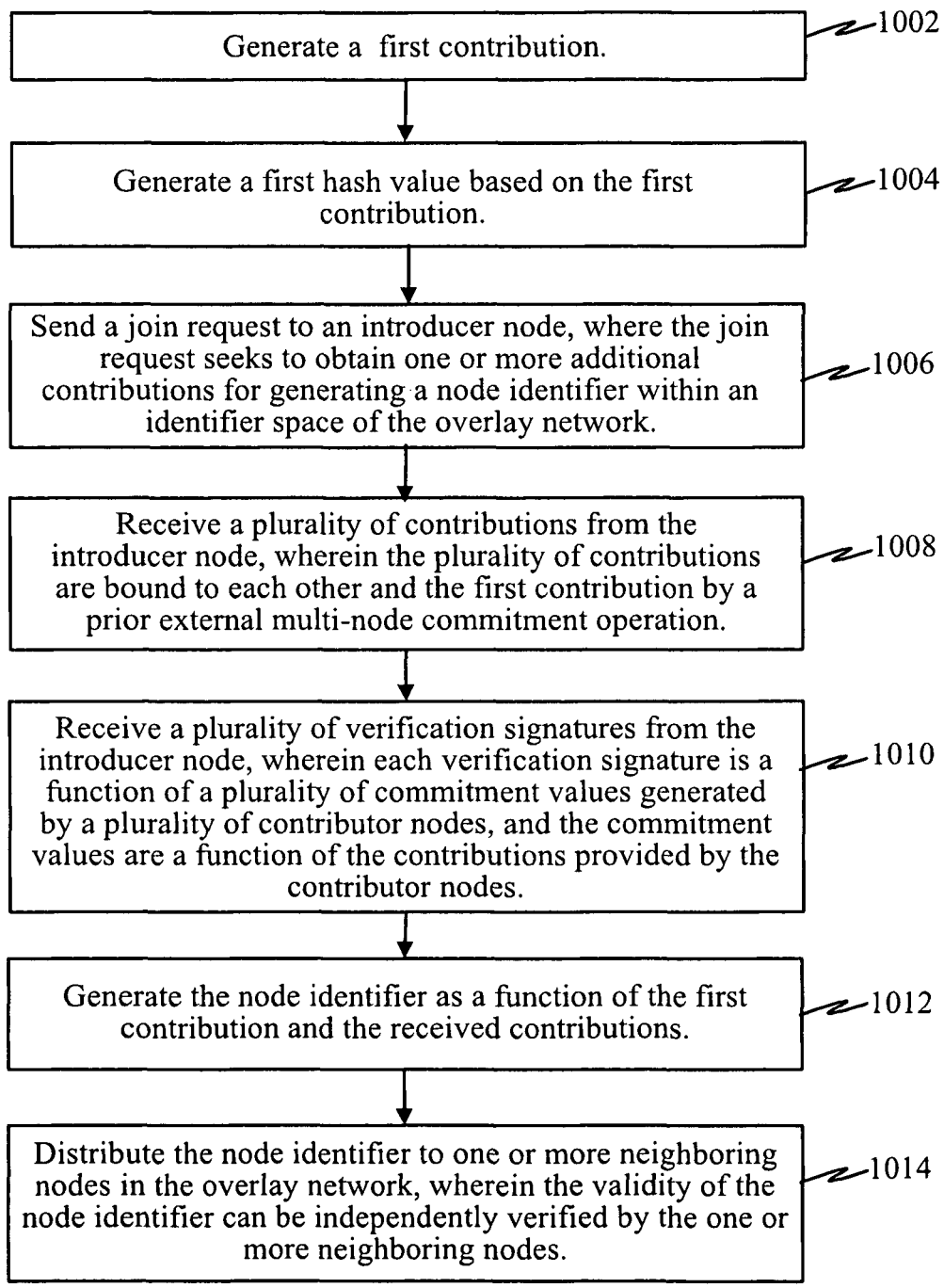
FIG. 10 illustrates an example of a method operational in a joining node for generating a node identifier for a peer-to-peer overlay network.

FIG. 10 illustrates an example of a method operational in a joining node for generating a node identifier for a peer-to-peer overlay network. The joining node may seek to obtain a node identifier in a manner that reduces or minimizes the opportunities for adversarial nodes to collude in selecting their own node identifier. The joining node may generate a first contribution 1002 (e.g., joining node random input value). Additionally, a first hash value may be generated based on the first contribution, where the subsequent join request may include the first hash value that can be used by a plurality of contributor nodes in calculating verification signatures 1004.

A join request may be sent to an introducer node, where the join request seeks to obtain one or more additional contributions for generating a node identifier within an identifier space of the overlay network 1006. The join request may include the first hash value of the first contribution, where the first hash value is provided to a plurality of contributor nodes and used in calculating verification signatures. The introducer node may be a randomly or pseudo-randomly selected node in the overlay network or it may be an assigned or trusted node within the overlay network. In response to the join request, the joining node may receive a plurality of contributions (e.g., random input values) from the introducer node, wherein the plurality of contributions are bound to each other and the first contribution by a prior external multi-node commitment operation 1008. In some examples, the joining node may also receive a plurality of verification signatures from the introducer node, wherein each verification signature is a function of a plurality of commitment values generated by a plurality of contributor nodes, and the commitment values are a function of the contributions provided by the contributor nodes 1010. Consequently, each verification signature binds the commitment values, and consequently the contributions, together prior to each contributor node actually disclosing its contribution. Note that the contributions may be either random or pseudorandom values. The node identifier may then be generated as a function of the first contribution and the received contributions 1012.

The joining node may then distribute the node identifier to one or more neighboring nodes in the overlay network, wherein the validity of the node identifier can be independently verified by the one or more neighboring nodes 1014. That is, the joining node may seek to be added to the Distributed Hash Tables (DHT) maintained by neighboring nodes for routing purposes within the overlay network. The DHTs are decentralized and each node in the overlay network maintains only a portion or subset of node identifiers in the overlay network. Each node has a unique node identifier in the DHT and likewise each service or object stored in the network has a unique identifier or identity.

In one example, the joining node may also have an asymmetric public and private key pair that may be used to secure its messaging.

Figure 11:
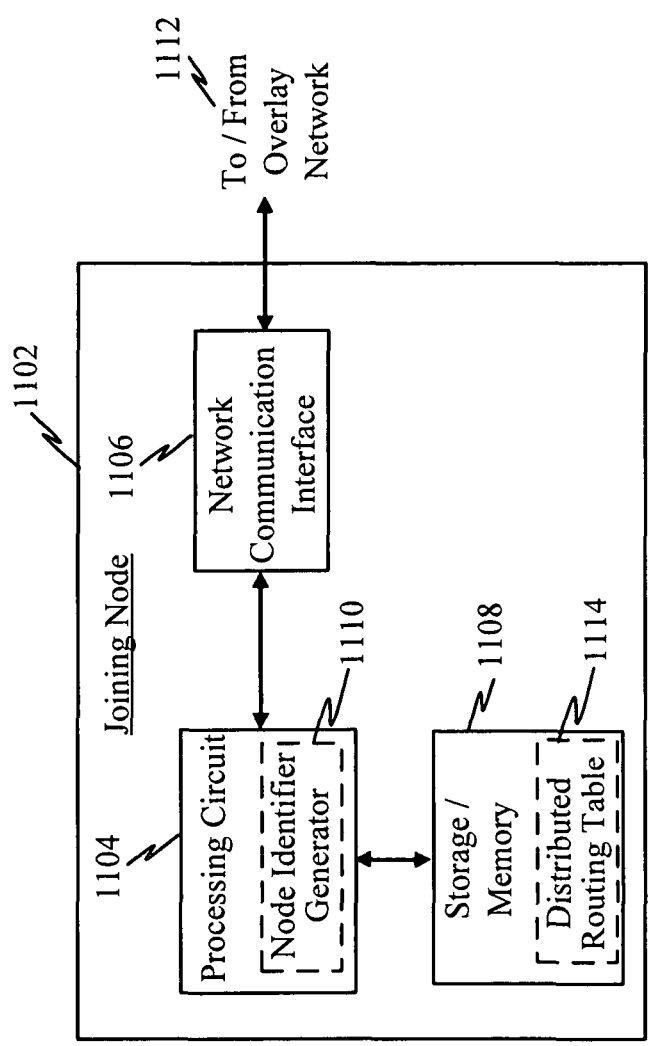
FIG. 11 is a block diagram illustrating an example of a device that may be seeking to operate as a node of an overlay network.

FIG. 11 is a block diagram illustrating an example of a device that may be seeking to operate as a node of an overlay network. The node device 1102 may include a processing circuit 1104 coupled to a network communication interface 1106, and (optionally) a storage device 1108. The processing circuit 1104 may include a node identifier generator 1110 configured to perform the method illustrated in FIG. 10. That is, the node identifier generator 1110 may be configured to request one or more contributions or input values from other nodes in the network (via the network communication interface 1106) which it then uses to generate its own node identifier. This node identifier may then be provided to neighboring nodes in the overlay network via the network communication interface 1106. In some implementations, the storage device 1108 may include a distributed routing table 1114 in which the node device 1102 may maintain routing (e.g., node identifier) information for one or more of its neighboring nodes. Such neighboring nodes are "neighboring" in the sense that their node identifiers are close in value to the node identifier for the node device 1102 (not necessarily physically close).

Figure 12:
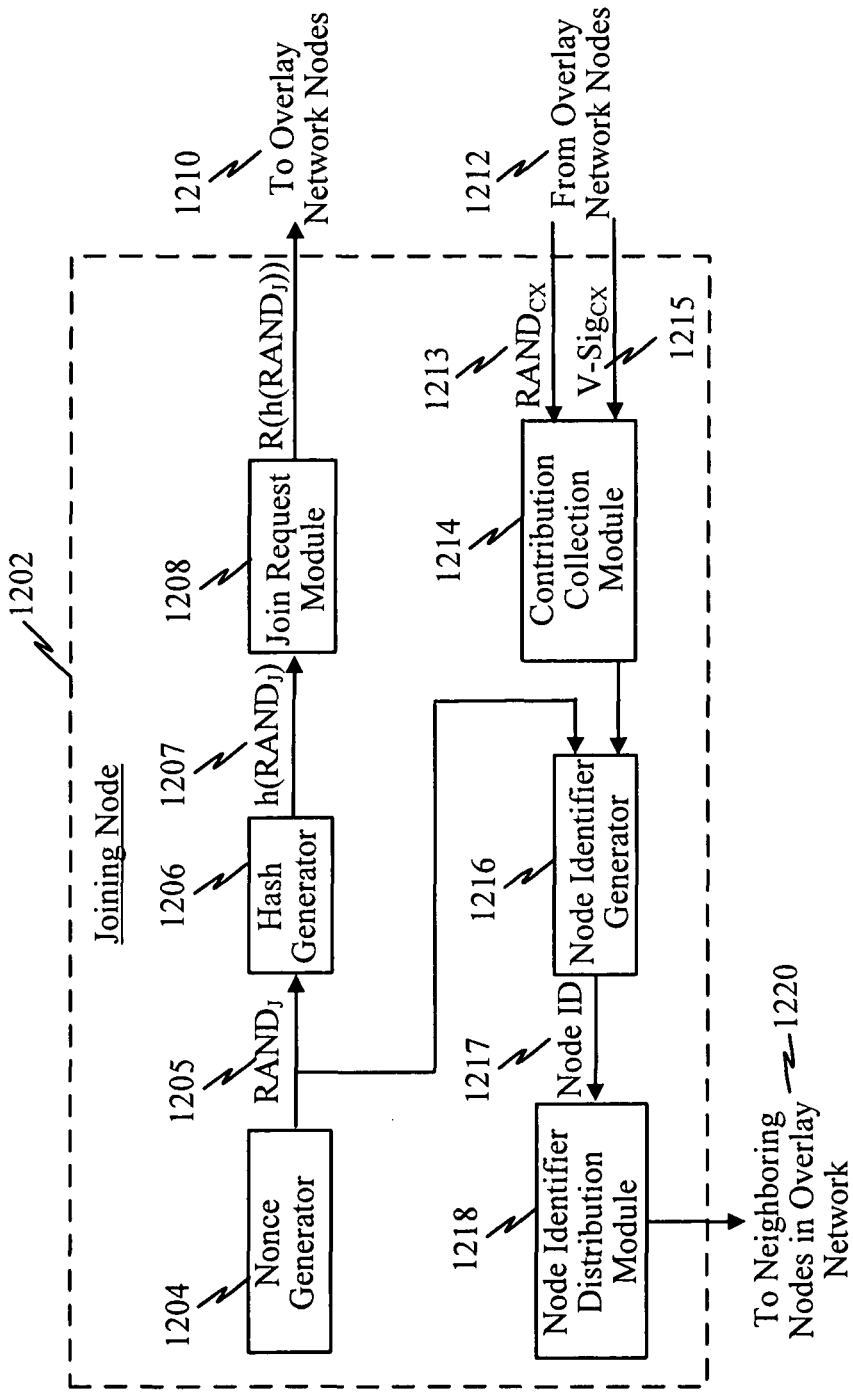
FIG. 12 is a block diagram illustrating an example of the functional components of a joining node.

FIG. 12 is a block diagram illustrating an example of the functional components of a joining node. The joining node 1202 may be seeking to generate its own node identifier with which it can join an overlay network. The joining node 1202 may include a contribution generator 1204 that may generate a random or pseudo-random contribution, input, or value $RAND_J$ 1205. A hash generator 1206 may apply a hashing function to the nonce or value $RAND_J$ 1205 to generate a hashed value $h(RAND_J)$ 1207. A join request module 1208 may then send a input request, including the hashed value $h(RAND_J)$ 1207 to an introducer node in the overlay network 1210. A contribution collection module 1214 may receive (in response to the request) one or more contributions, inputs, or values $RAND_{CX}$ 1213 and/or one or more corresponding commitment binding verification signatures $V\text{-}Sig_{CX}$ 1215 from a plurality of nodes of the overlay network 1212. The one or more contributions $RAND_{CX}$ 1213 and the contribution $RAND_J$ 1205 then serve as inputs to a node identifier generator 1216 that generates a node identifier (Node ID) 1217 that the joining device 1202 can use. A node identifier distribution module 1218 may then send the node identifier Node ID 1217 to one or more neighboring nodes 1220 in the overlay network so the joining node can be added to their distributed routing tables. The neighboring nodes may be nodes that have node identifiers that are close in value to the node identifier 1217.

Example of Introducer Node

Figure 13:
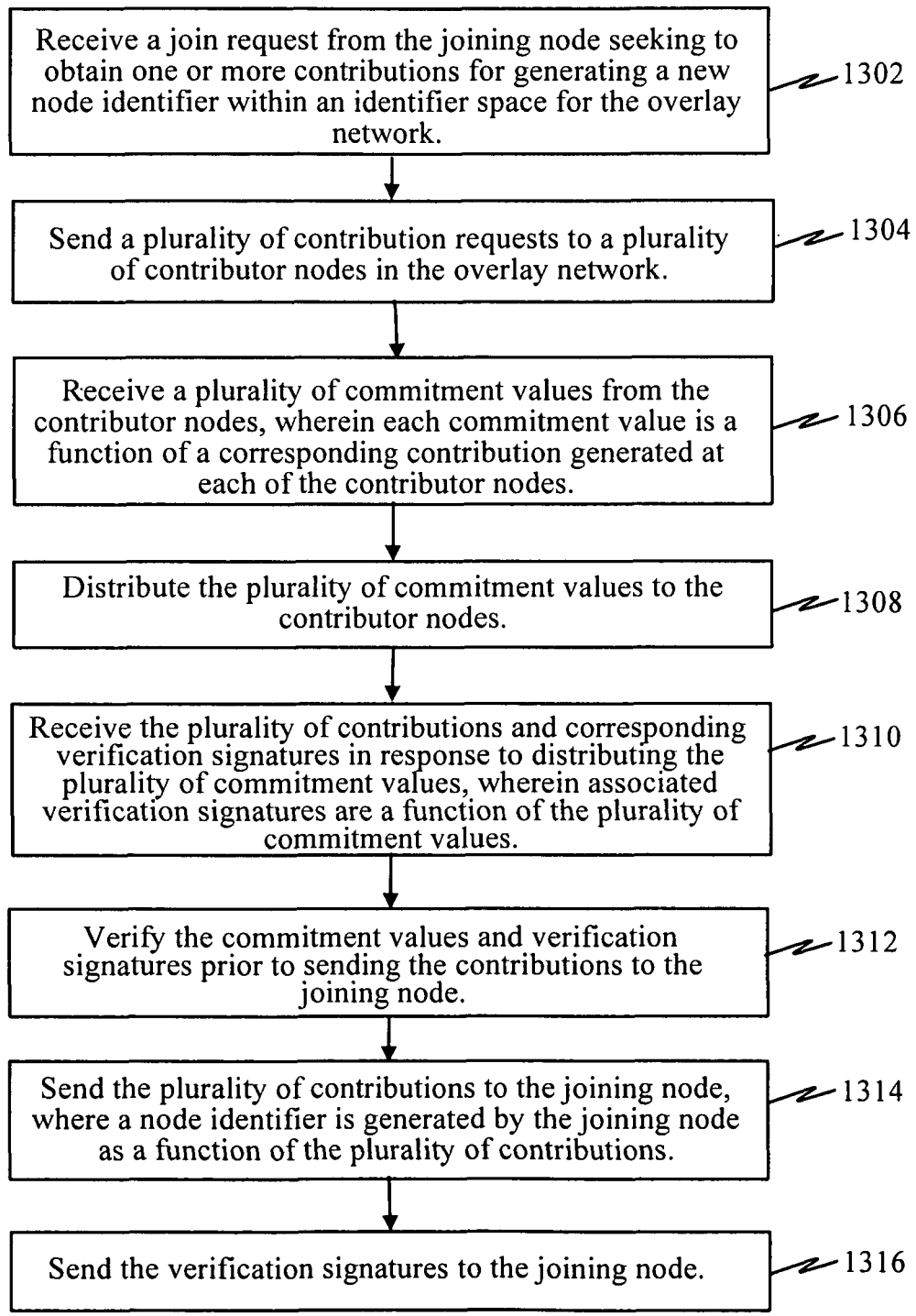
FIG. 13 illustrates an example of a method operational in an introducer node to facilitate a joining node to obtain a node identifier in a peer-to-peer overlay network.

FIG. 13 illustrates an example of a method operational in an introducer node to facilitate a joining node to obtain a node identifier in a peer-to-peer overlay network. A join request may be received from the joining node seeking to obtain one or more contributions for generating a new node identifier within an identifier space for the overlay network 1302. The join request may include a first hash value of a first contribution, where the first hash value may be subsequently provided to contributor nodes and used in calculating verification signatures. The introducer node may send a plurality of contribution requests to a plurality of contributor nodes in the overlay network 1304. In one example, the number of contributor nodes to which the contribution requests are sent is at least one more than a number of (expected, possible, or anticipated) adversarial nodes in the overlay network. Additionally, the contributor nodes to which the contribution requests are sent may be either randomly or pseudo-randomly selected.

A plurality of commitment values may be received from the contributor nodes, wherein each commitment value is a function of a corresponding contribution generated at each of the contributor nodes 1306. The plurality of commitment values may then be distributed to the contributor nodes 1308. In one implementation, the plurality of commitment values may be distributed directly by the contributor nodes to other contributor nodes. However, by first sending the commitment values to the introducer node, all the commitment values can be collected prior to any contributor node receiving a commitment value from another contributed node, thus preventing an adversarial contributor node from modifying its own commitment value to achieve a particular node identifier.

In response to distributing the plurality of commitment values, a plurality of contributions (e.g., input values) and corresponding verification signatures may be received, wherein each verification signature is a function of the plurality of commitment values 1310. Note that the introducer node may receive a verification signature from each of the contributor nodes, wherein each verification signature is a function of the plurality of commitment values. Each verification signature may bind the commitment values (and consequently the contributions) together prior to each contributor node actually disclosing its contribution. Additionally, each verification signature may also be a function of a first value (e.g., a hash of a joining node contribution) from the joining node.

The introducer node may verify the commitment values and verification signatures prior to sending the contributions to the joining node 1312. The plurality of contributions may then be sent to the joining node, where a node identifier is generated by the joining node as a function of the plurality of contributions 1314 and, possibly, the joining node's own contribution and/or public key. The contributions may be random or pseudorandom values. Additionally, the verification signatures may also be sent to the joining node 1316.

Figure 14:
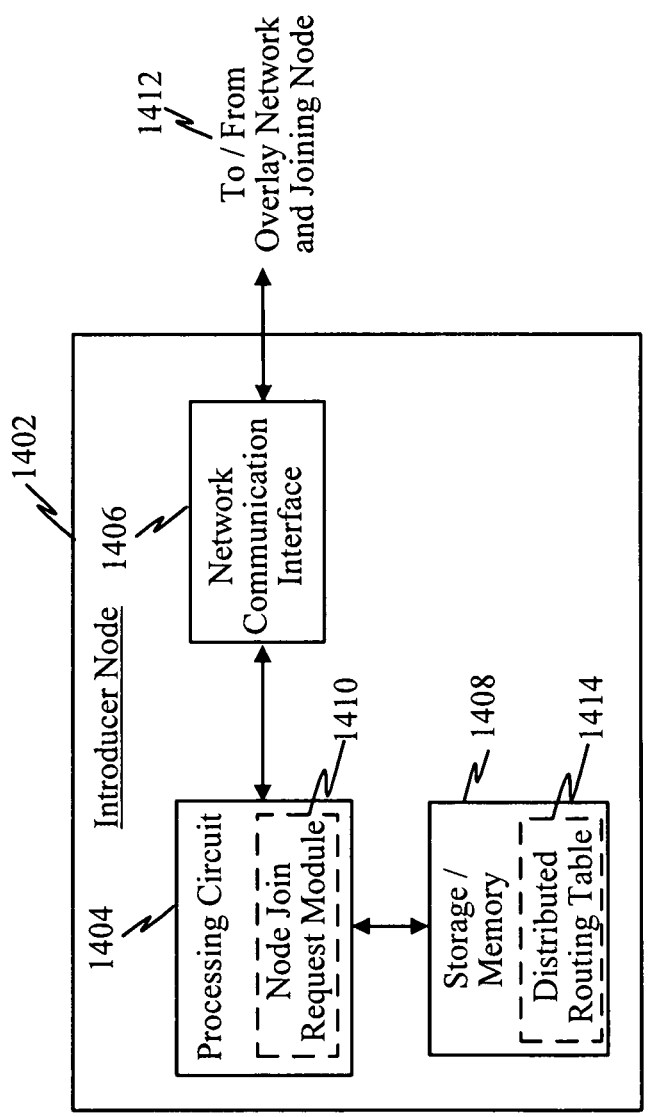
FIG. 14 is a block diagram illustrating an example of a device that may operate as an introducer node of an overlay network to facilitate the generation of a node identifier by a joining node.

FIG. 14 is a block diagram illustrating an example of a device that may operate as an introducer node of an overlay network to facilitate the generation of a node identifier by a joining node. The node device 1402 may include a processing circuit 1404 coupled to a network communication interface 1406, and (optionally) a storage device 1408. The processing circuit 1404 may include a node join request module 1410 configured to assist another node in generating its own node identifier as illustrated in the method of FIG. 13. That is, the node join request module 1410 may receive a request from a node (via the network communication interface 1406) for assistance in obtaining contributions to generate a node identifier. The node join request module 1410 may be configured to send a commitment request (via the network communication interface 1406) to one or more contributor nodes in the overlay network and receive one or more contributions from the contributor nodes. The node join request module 1410 then passes the one or more contributions to the requesting node. In some implementations, the storage device 1408 may include a distributed routing table 1414 in which the node device 1402 may maintain routing (e.g., node identifier) information for one or more of its neighboring nodes.

Figure 15:
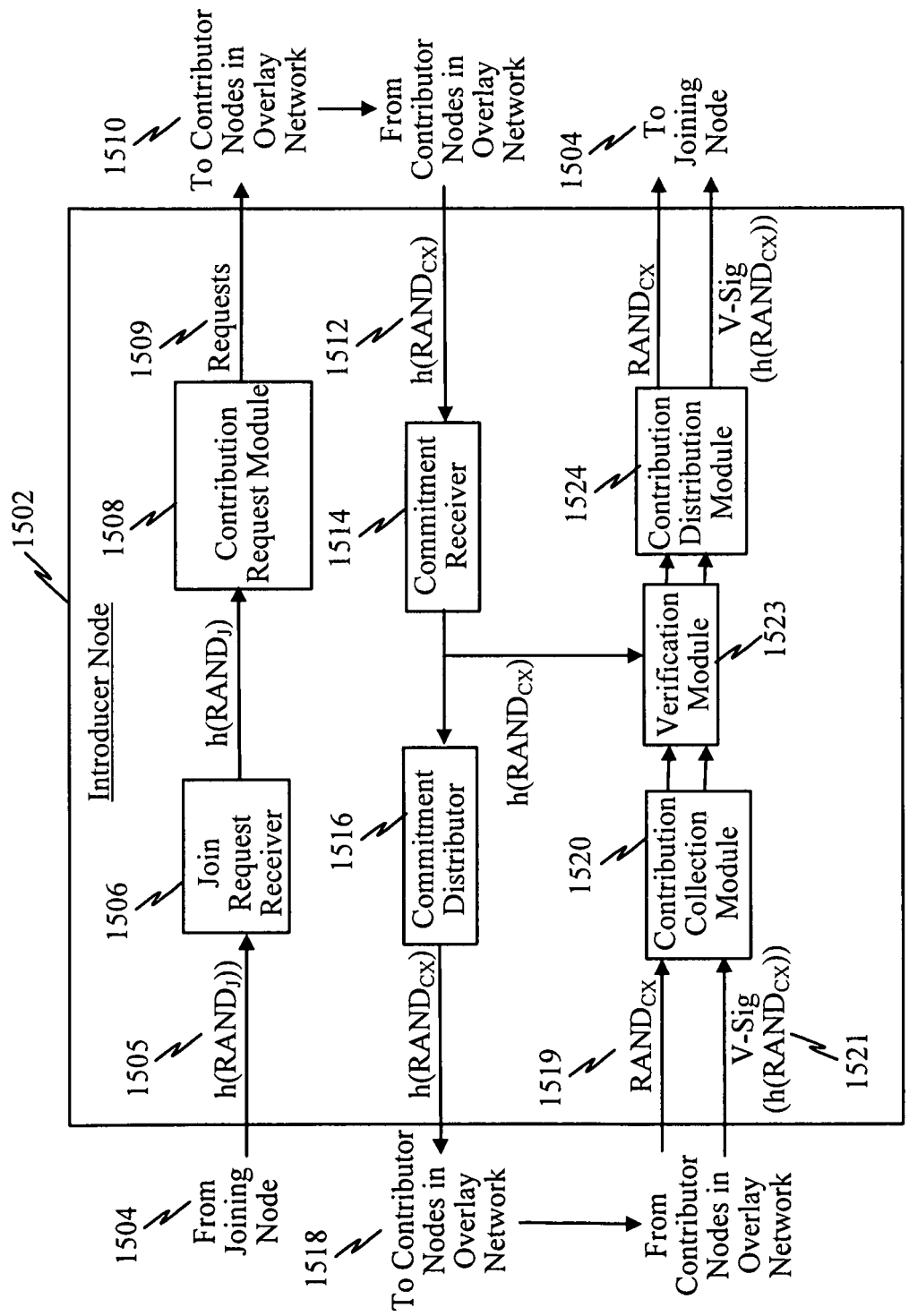
FIG. 15 is a block diagram illustrating an example of the functional components of an introducer node.

FIG. 15 is a block diagram illustrating an example of the functional components of an introducer node. The introducer node 1502 may include a join request receiver 1506 that receives join request messages 1505 from a joining node 1504. The join request message 1505 may include a hash value $h(RAND_J)$ of a nonce $RAND_J$ from the joining node. A contribution request module 1508 may send out one or more requests 1509 to one or more contributor nodes 1510 in the overlay network. Each of the contributor nodes may provide a commitment value $h(RAND_{CX})$ 1512 that may be a function of the actual contribution $RAND_{CX}$ it intends to make. The commitment value 1512 may be a hash of the actual contribution so the actual contribution is not disclosed at this point. A commitment distribution module 1516 may distribute the received commitment values to all contributor nodes 1518. The contributor nodes can now bind the commitment values $h(RAND_{CX})$ to each other by a verification signature (e.g., $V\text{-}Sig_k = hash(h(RAND_{CX}))$ for $x=0\ldots m$), consequently also binding the yet to be disclosed contributions $RAND_{CX}$. In response to sending the commitment values $h(RAND_{CX})$ for the other contributor nodes, a contribution collection module 1520 may receive the contribution $RAND_{CX}$ 1519, and possibly the verification signature $V\text{-}Sig(h(RAND_{CX}))$ 1521 from each contributor node. A verification module 1523 may verifying the commitment values and verification signatures prior to sending the contributions to the joining node. A contribution distribution module 1524 may then send the received contributions $RAND_{CX}$ and also the verification signatures V-Sig to the joining node 1504.

Example of Contributor Node

Figure 16:
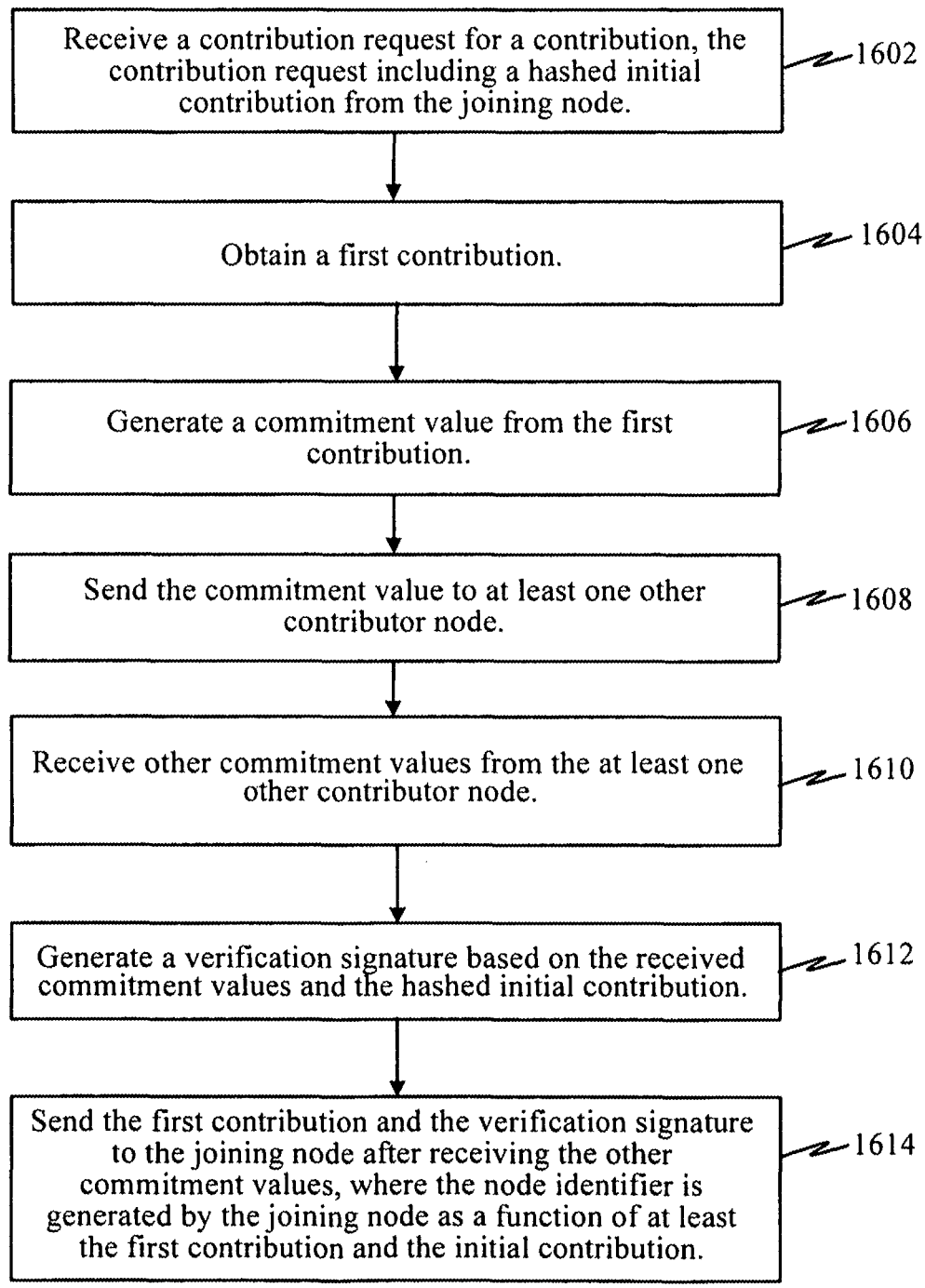
FIG. 16 illustrates an example of a method operational in a contributor node to facilitate a joining node to obtain a node identifier in a peer-to-peer overlay network.

FIG. 16 illustrates an example of a method operational in a contributor node to facilitate a joining node to obtain a node identifier in a peer-to-peer overlay network. A contribution request for a contribution may be received, where the contribution request includes a hashed initial contribution from the joining node 1602. The contributor node may obtain a first contribution 1604 and generates a commitment value from the first contribution 1606. The contributor node then sends the commitment value to at least one other contributor node 1608. Other commitment values may then be received from the at least one other contributor node 1610. A verification signature may be generated based on the received commitment values and the hashed initial contribution 1612. The first contribution and the verification signature may be sent to the joining node after receiving the other commitment values, where the node identifier is generated by the joining node as a function of at least the first contribution and the initial contribution 1614. The first contribution may be one of either a random or pseudorandom value. The verification signature binds the commitment values and hashed initial contribution from the joining node, thereby allowing other nodes to subsequently verify the authenticity of the node identifier. In one implementation, the commitment value may first be sent to an introducer node that collects the commitment values and then distributes them to the contributor node.

Figure 17:
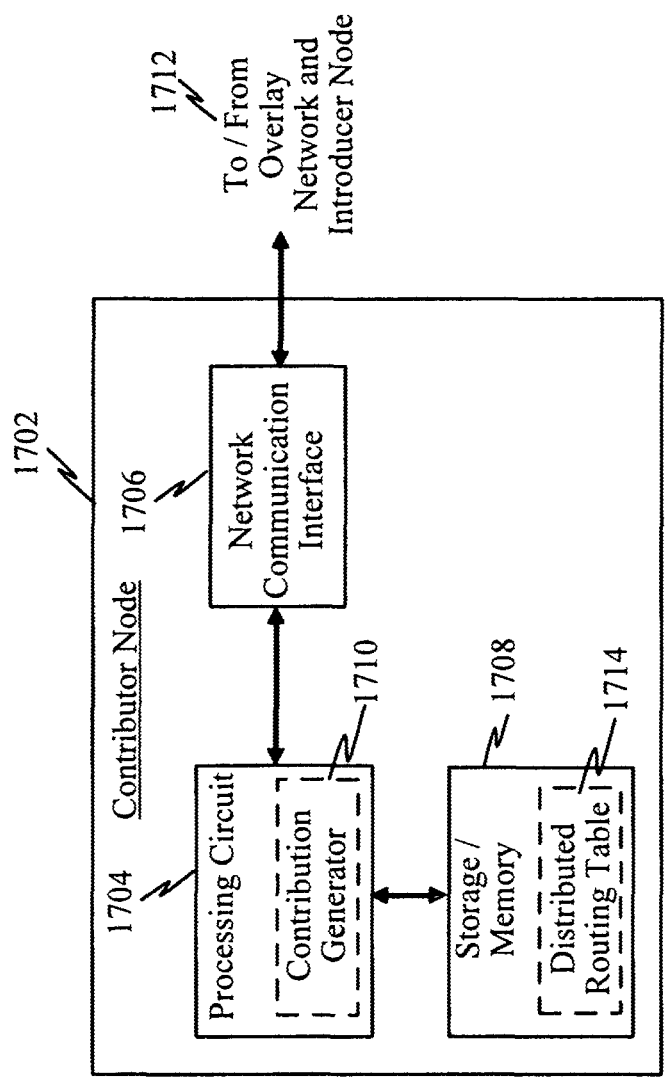
FIG. 17 is a block diagram illustrating an example of a device that may operate as a contributor node in an overlay network to facilitate the generation of a node identifier by a joining node.

FIG. 17 is a block diagram illustrating an example of a device that may operate as a contributor node in an overlay network to facilitate the generation of a node identifier by a joining node. The node device 1702 may include a processing circuit 1704 coupled to a network communication interface 1706, and (optionally) a storage device 1708. The processing circuit 1704 may include a contribution generator 1710 configured to assist another node in generating its own node identifier as illustrated in the method of FIG. 16. That is, the contribution generator 1710 may receive a contribution request from a node (via the network communication interface 1706) for obtaining a contribution to generate a node identifier. The contribution generator 1710 may be configured to calculate a commitment value based on a first contribution. The commitment value is then sent (via the network communication interface 1706) to one or more other contributor nodes in the overlay network. The contributor node 1702 may then receive one or more commitment values from other contributor nodes. These commitment values are then combined to generate a verification signature which is sent to the joining node along with the first contribution.

Figure 18:
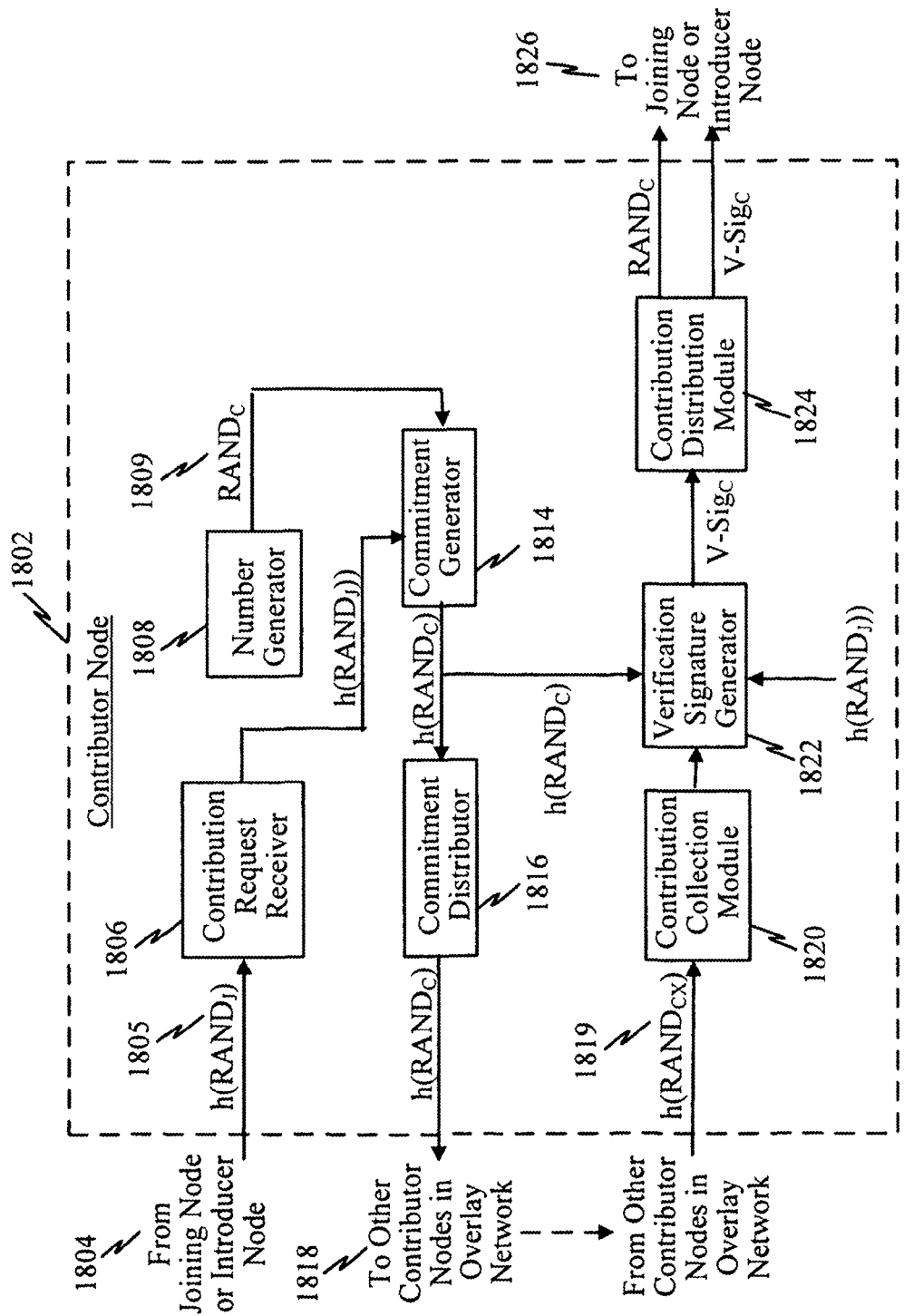
FIG. 18 is a block diagram illustrating an example of the functional components of a contributor node.

FIG. 18 is a block diagram illustrating an example of the functional components of a contributor node. The contributor node 1802 may include a contributor request receiver 1806 for receiving a contribution request 1805 for a contribution, the contribution request including a hashed initial contribution $h(RAND_J)$ from the joining node or introducer node 1804. A number generator 1808 (e.g., contribution generator) then obtains a first contribution $RAND_C$ 1809. A commitment generator 1814 then generates a commitment value $h(RAND_C)$ from the first contribution $RAND_C$. A commitment distributor 1816 may send the commitment value $h(RAND_C)$ to at least one other contributor node 1818. A contribution collection module 1820 may receive other commitment values $h(RAND_{CX})$ from the at least one other contributor nodes. A verification signature generator 1822 may generate a verification signature V-Sig$_C$ based on the received commitment values $h(RAND_{CX})$ and the hashed nonce $h(RAND_J)$. A contribution distribution module 1824 may send the first contribution $RAND_C$ and the verification signature V-Sig$_C$ to the joining node 1804 after receiving the other commitment values $h(RAND_{CX})$, where the node identifier is generated by the joining node as a function of at least the first contribution and the initial contribution. Consequently, the verification signature binds the commitment values and hashed nonce, thereby allowing other nodes to subsequently verify the authenticity of the node identifier.

Scalable Node ID Generation Using Multi-party Commitment

According to another aspect, the multi-party commitment method of FIGS. 8 and 9 may be further optimized by attempting to reduce the number of contributing nodes that are contacted to obtain random inputs for node ID generation. A significant complexity in the multi-party commitment method comes from the fact that the number of contributor nodes should be at least one more than the number of adversarial node in the network. In a system with a reasonably large number of overlay nodes, this causes unacceptable number of messages and signatures at the time that a node joins. If the rate of node joins is high, this could lead to a lot of undesirable overlay network traffic. Also, outside the fact that it is tough to accurately estimate the number of adversarial nodes in a practical system, it also places a limit on that not-so-accurate number beyond which the scheme cannot be guaranteed to produce genuinely random identities.

If it is possible to ensure that random contributor nodes can be picked for providing random inputs for node ID generation, the number of such contributor nodes can be reduced to a just a few. This would ensure with high probability that the input was not provided by a colluding node in the system. Several approaches are possible for optimizing the multi-party commitment method above. One approach is to use a hash chain of the joining node's public key, or a predefined pseudorandom generation function with the joining node's public key as seed, to provide a set of node IDs that would act as contributor nodes. Another approach is to use the node IDs resulting from such a hash chain or pseudorandom function as direct inputs to the joiner's node ID algorithm to keep the number of messages low. In both of these cases, given that the joining node can create various public keys to arrive at convenient node IDs, a chosen location attack is not protected against effectively.

Another approach provides for using the introducer node's public key $Pu_I$ to find the contributor nodes. There are several ways to randomly pick the contributor nodes based on the introducer node's public key. For example, a value x may be calculated as $x=h(Pu_I\|\text{"String"})$, where $Pu_I$ is the public key of the introducer node and "String" may be a fixed value or slowly changing value. The value x is used to find a node $n_c$ that is responsible for that point (i.e., value x) in the overlay network. The node $n_c$ is then used to determine nodes $n_{c\text{-}prev}$ and $n_{c\text{-}next}$ which are the predecessor and successor nodes to node $n_c$ in the overlay network respectively. These nodes $n_{c\text{-}prev}$ and $n_{c\text{-}next}$ are chosen as the randomness contributors for generating a new node identifier for a joining node. The multi-party randomness contribution is run with these nodes as the contributors.

In another variation, the contributor nodes are selected by calculating a value x such that $x=h(Pu_I\|\text{"String-1"})$, $y=h(Pu_I\|\text{"String-2"})$, and $z=h(Pu_I\|\text{"String-3"})$, where "String-1", "String-2" and "String-3" may be fixed values or slowly changing values. The values x, y, and z may be used to find a plurality of nodes $n_X$, $n_Y$, and $n_Z$ that are responsible for the corresponding points (i.e., values x, y, and z) in the overlay network. Having determined the nodes $n_X$, $n_Y$, and $n_Z$ that are responsible for the calculated points (i.e., values x, y, and z) in the overlay network, these nodes $n_x$, $n_y$, and $n_z$ may be used as the contributors nodes that provide input values to a joining node.

Note that, upon receiving a request (with a new node identifier) from a joining node to be added as a neighboring node, a neighboring node should be able to independently verify the new node identifier. To do this, the neighboring node obtains the information as illustrated in FIG. 9 as a verifier.

These scaled multi-node commitments are completely decentralized and require no special entities. They ensure the same level of identity strength as in the case of centrally assigned identities. All nodes are treated equal from a trust perspective and hence, these scaled methods handle various kinds of true peer-to-peer overlay networks. The extra number of messages needed to handle joins in this solution is small and constant, irrespective of the total number of nodes in the overlay. The extra number of cryptographic operations needed is also limited to a small number and constant irrespective of the total number of nodes in the overlay.

It should be recognized that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One or more of the components, steps, and/or functions illustrated in FIGS. 1, 2, 3, 4, 5, 6, 7, 8, 9, 10, 11, 12, 13, 14, 15, 16, 17 and/or 18 may be rearranged and/or combined into a single component, step, or function or embodied in several components, steps, or functions. Additional elements, components, steps, and/or functions may also be added without departing from the invention. The apparatus, devices, and/or components illustrated in FIGS. 11, 12, 14, 15, 17 and/or 18 may be configured to perform one or more of the methods, features, or steps described in FIGS. 1, 2, 3, 4, 5, 6, 7, 8, 9, 10, 13, and/or 16. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. For example, some implementations of the invention may be performed with a moving or static communication device (e.g., access terminal) and a plurality of mobile or static base stations (e.g., access points).

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A method operational on a joining node for generating a node identifier of the joining node for use with a peer-to-peer overlay network, comprising:
   generating an initial contribution value for use in generating the node identifier of the joining node;
   sending a join request to an introducer node of the peer-to-peer overlay network, where the join request seeks to obtain a plurality of contribution values from a plurality of contributor nodes within the overlay network for use in generating the node identifier of the joining node from within an identifier space of the overlay network;

receiving a join response from the introducer node, the join response including the plurality of contribution values obtained from the plurality of contributor nodes via the introducer node, wherein the plurality of contribution values are bound to each other and to the initial contribution value by a prior external multi-node commitment operation; and generating the node identifier of the joining node based on the initial contribution value and the plurality of received contribution values included in the join response wherein the node identifier is generated as a function of the initial contribution value and the plurality of received contribution values included in the join response.

2. The method of claim 1, further comprising:

generating an initial hash value based on the initial contribution value, where the join request includes the initial hash value used by the plurality of contributor nodes for generating a plurality of verification signatures.

3. The method of claim 2, further comprising:

receiving a plurality of verification signatures from the introducer node, wherein each verification signature is a function of a plurality of commitment values generated by the plurality of contributor nodes, and the commitment values are a function of a corresponding one of the plurality of contribution values obtained from the contributor nodes.

4. The method of claim 3, wherein each verification signature binds the commitment values to one another, and also binds the plurality of contribution values to one another, prior to each contributor node disclosing its contribution value to at least one other node.

5. The method of claim 1, wherein the initial contribution value and the plurality of contribution values include one or more of random and pseudorandom values.

6. The method of claim 1, wherein the prior external multi-node commitment operation includes:

receiving, at the introducer node, a plurality of hash values of the plurality of contribution values from a plurality of contributor nodes before the plurality of contributor nodes disclose their contribution values to one another.

7. The method of claim 1, further comprising:

distributing the node identifier to at least one neighboring node in the overlay network, wherein a validity of the node identifier can be independently verified by the at least one neighboring node.

8. A network device comprising:

a network communication interface for communicating with a peer-to-peer overlay network; and a processing circuit coupled to the network communication interface, the processing circuit configured to:

generate an initial contribution value for use in generating a node identifier of a joining node;

send a join request to an introducer node of the peer-to-peer overlay network, where the join request seeks to obtain a plurality of contribution values from a plurality of contributor nodes within the overlay network for use in generating the node identifier of the joining node from within an identifier space of an overlay network;

receive a join response from the introducer node, the join response including the plurality of contribution values obtained from the plurality of contributor nodes via the introducer node, wherein the plurality of contribution values are bound to each other and to the initial contribution value by a prior external multi-node commitment operation; and generate the node identifier of the joining node based on the initial contribution value and the plurality of received contribution values included in the join response wherein the node identifier is generated as a function of the initial contribution value and the plurality of received contribution values included in the join response.

9. The device of claim 8, wherein the processing circuit is further configured to:

generate an initial hash value based on the initial contribution value, where the join request includes the initial hash value used by the plurality of contributor nodes for generating a plurality of verification signatures.

10. The device of claim 9, wherein receiving a plurality of contribution values from the introducer node comprises receiving a plurality of verification signatures from the introducer node, wherein each verification signature is a function of a plurality of commitment values generated by the plurality of contributor nodes, and the commitment values are a function of a corresponding one of the plurality of contribution values obtained from the contributor nodes.

11. The device of claim 10, wherein each verification signature binds the commitment values to one another, and also binds the plurality of contribution values to one another, prior to each contributor node disclosing its contribution to at least one other node.

12. The device of claim 8, wherein the initial contribution value and the plurality of contribution values include one or more of random and pseudorandom values.

13. The device of claim 8, wherein the prior external multi-node commitment operation includes:

receiving, at the introducer node, a plurality of hash values of the plurality of contribution values from a plurality of contributor nodes before the plurality of contributor nodes disclose their contribution values to one another.

14. The device of claim 8, wherein the processing circuit is further configured to:

distribute the node identifier to at least one neighboring node in the overlay network, wherein a validity of the node identifier can be independently verified by the at least one neighboring node.

15. A network device comprising:

means for generating an initial contribution value for use in generating a node identifier of a joining node;

means for sending a join request to an introducer node of a peer-to-peer overlay network, where the join request seeks to obtain a plurality of contribution values from a plurality of contributor nodes within the overlay network for use in generating the node identifier of the joining node from within an identifier space of an overlay network;

means for receiving a join response from the introducer node, the join response including the plurality of contribution values obtained from the plurality of contributor nodes via the introducer node, wherein the plurality of contribution values are bound to each other and to the initial contribution value by a prior external multi-node commitment operation; and means for generating the node identifier of the joining node based on the initial contribution value and the plurality of received contribution values included in the join response wherein the node identifier is generated as a function of the initial contribution value and the plurality of received contribution values included in the join response.

16. The device of claim 15, further comprising:
means for receiving a plurality of verification signatures from the introducer node, wherein each verification signature is a function of a plurality of commitment values generated by the plurality of contributor nodes, and the commitment values are a function of the plurality of contribution values obtained from the contributor nodes.

17. The device of claim 15, further comprising:
means for distributing the node identifier to at least one neighboring node in the overlay network, wherein the validity of the node identifier can be independently verified by the at least one neighboring node.

18. A processor, comprising:
a first circuit to generate a first an initial contribution value for use in generating a node identifier of a joining node;
a second circuit to send a join request to an introducer node of a peer-to-peer overlay network, where the join request seeks to obtain a plurality of contribution values from a plurality of contributor nodes within the overlay network for use in generating the node identifier from within an identifier space of an overlay network;
a third circuit to receive a join response from the introducer node, the join response including the plurality of contribution values obtained from the plurality of contributor nodes via the introducer node, wherein the plurality of contribution values are bound to each other and to the initial contribution value by a prior external multi-node commitment operation; and
a fourth circuit to generate the node identifier of the joining node based on the initial contribution value and the plurality of received contribution values included in the join response wherein the node identifier is generated as a function of the initial contribution value and the plurality of received contribution values included in the join response.

19. The processor of claim 18, further comprising:
a fifth circuit to receive a plurality of verification signatures from the introducer node, wherein each verification signature is a function of a plurality of commitment values generated by the plurality of contributor nodes, and the commitment values are a function of the plurality of contribution values obtained from the contributor nodes.

20. The processor of claim 18, further comprising:
a sixth circuit to distribute the node identifier to at least one neighboring node in the overlay network, wherein the validity of the node identifier can be independently verified by the at least one neighboring node.

21. A non-transitory machine-readable medium comprising instructions operational in a node for generating a node identifier of the node for use within a peer-to-peer overlay network, which when executed by one or more processors causes the processors to:
generate a an initial contribution value for use in generating a node identifier of a joining node;
send a join request to an introducer node of a peer-to-peer overlay network, where the join request seeks to obtain a plurality of contribution values from a plurality of contributor nodes within the overlay network for use in generating the node identifier of the joining node from within an identifier space of an overlay network;
receive a join response from the introducer node, the join response including the plurality of contribution values obtained from the plurality of contributor nodes via the introducer node, wherein the plurality of contribution values are bound to each other and to the initial contribution by a prior external multi-node commitment operation; and generate the node identifier of the joining node based on the initial contribution value and the plurality of received contribution values included in the join response wherein the node identifier is generated as a function of the initial contribution value and the plurality of received contribution values included in the join response.

22. The non-transitory machine-readable medium of claim 21, further comprising one or more instructions which when executed by the one or more processors causes the processors to:
receive a plurality of verification signatures from the introducer node, wherein each verification signature is a function of a plurality of commitment values generated by the plurality of contributor nodes, and the commitment values are a function of the plurality of contribution values obtained from the contributor nodes.

23. The non-transitory machine-readable medium of claim 21, further comprising one or more instructions which when executed by the one or more processors causes the processors to:
distribute the node identifier to at least one neighboring node in the overlay network, wherein the validity of the node identifier can be independently verified by the at least one neighboring node.

24. A method operational on an introducer node for assisting a joining node in generating a node identifier for use in a peer-to-peer overlay network, comprising:
receiving a join request from the joining node seeking to obtain a plurality of contribution values from a plurality of contributor nodes within the overlay network for use in generating the node identifier of the joining node from within an identifier space for the overlay network;
sending a plurality of contribution requests to the plurality of contributor nodes in the overlay network to obtain the plurality of contribution values from the plurality of contributor nodes;
receiving a plurality of commitment values from the contributor nodes, wherein each commitment value is a function of a corresponding contribution value generated at each of the contributor nodes;
distributing the plurality of commitment values among the contributor nodes;
receiving the plurality of contribution values and corresponding verification signatures in response to distributing the plurality of commitment values, wherein each verification signature is a function of the plurality of commitment values; and
sending the plurality of contribution values to the joining node.

25. The method of claim 24, wherein the contributions include one or more of random and pseudorandom values.

26. The method of claim 24, wherein the join request includes an initial hash value of an initial contribution value from the joining node, where the initial hash value is provided to the contributor nodes for use in generating the verification signatures.

27. The method of claim 24, wherein the plurality of commitment values are distributed directly by the contributor nodes to other contributor nodes.

28. The method of claim 24, wherein a contribution value and verification signature pair is received from each of the plurality of contributor nodes.

29. The method of claim 24 wherein each verification signature is also a function of an initial contribution value received from the joining node.

30. The method of claim 29, wherein each verification signature binds the commitment values to one another, and also binds the contribution values to one another, prior to each contributor node disclosing its contribution to at least one other node.

31. The method of claim 24, further comprising:
verifying the commitment values and verification signatures prior to sending the contribution values to the joining node.

32. The method of claim 24, further comprising:
sending the verification signatures to the joining node.

33. The method of claim 24, wherein the number of contributor nodes to which the contribution requests are sent is at least one more than a number of adversarial nodes in the overlay network.

34. The method of claim 24, wherein the contributor nodes to which the contribution requests are sent are selected using one or more of random and pseudo-random selection.

35. The method of claim 24,
wherein the contributor nodes are a reduced set of nodes selected from a larger set of nodes in the peer-to-peer overlay network.

36. The method of claim 35, wherein the reduced set of contributor nodes are randomly selected from the larger set of nodes so as to limit the possibility of collusion among nodes.

37. The method of claim 36, wherein the contributor nodes are randomly selected based on a public key for the joining node.

38. The method of claim 36, wherein the contributor nodes are randomly selected based on a public key for the introducer node.

39. The method of claim 38, wherein a value x is generated based on the public key for the introducer node, the value x being used to find a node $n_C$ in the overlay network, the node $n_C$ then being used to determine a previous node $n_{C\text{-}PREV}$ and a next node $n_{C\text{-}NEXT}$ where the previous node and next node are utilized as contributor nodes.

40. The method of claim 38, wherein a value x is generated based on the public key for the introducer node and a first string, a value y is generated based on the public key for the introducer node and a second string, and a value z is generated based on the public key for the introducer node and a third string, the values x, y, and z then being used to find a plurality of nodes $n_X$, $n_Y$, and $n_Z$ that are responsible for the corresponding values x, y, and z in the overlay network, these plurality of nodes $n_X$, $n_Y$, and $n_Z$ then being used as the contributors nodes.

41. A network device comprising:
a network communication interface for communicating with a peer-to-peer overlay network; and
a processing circuit coupled to the network communication interface, the processing circuit configured to:
receive a join request from a joining node seeking to obtain one or more contribution values from a plurality of contributor nodes within the overlay network for use in generating a node identifier for the joining node from within an identifier space for the overlay network;
send a plurality of contribution requests to the plurality of contributor nodes in the overlay network to obtain the plurality of contribution values from the plurality of contributor nodes;
receive a plurality of commitment values from the contributor nodes, wherein each commitment value is a function of a corresponding contribution value generated at each of the contributor nodes;
distribute the plurality of commitment values [[to]] among the contributor nodes;
receive the plurality of contribution values and corresponding verification signatures in response to distributing the plurality of commitment values, wherein each verification signature is a function of the plurality of commitment values; and
send the plurality of contribution values to the joining node.

42. The device of claim 41, wherein the contributions include one or more of random and pseudorandom values.

43. The device of claim 41, wherein the join request includes an initial hash value of a initial contribution value from the joining node, where the initial hash value is provided to the contributor nodes and for use in generating the verification signatures.

44. The device of claim 41, wherein the plurality of commitment values are distributed directly by the contributor nodes to other contributor nodes.

45. The device of claim 41, wherein each verification signature is also a function of an initial contribution value received from the joining node.

46. The device of claim 45, wherein each verification signature binds the commitment values to one another, and also binds the contribution values to one another, prior to each contributor node disclosing its contribution to at least one other node.

47. The device of claim 41, wherein the processing circuit is further configured to:
verify the commitment values and verification signatures prior to sending the contribution values to the joining node.

48. The device of claim 41, wherein the verification signatures are sent to the joining node.

49. The device of claim 41, wherein the number of contributor nodes to which the contribution requests are sent is at least one more than a number of adversarial nodes in the overlay network.

50. The device of claim 41, wherein the contributor nodes to which the contribution requests are sent are selected using one or more of random and pseudo-random selection.

51. A network device comprising:
means for receiving a join request from a joining node seeking to obtain a plurality of contribution values from a plurality of contributor nodes within an overlay network for use in generating the node identifier of the joining node from within an identifier space for the overlay network;
means for sending a plurality of contribution requests to the plurality of contributor nodes in the overlay network to obtain the plurality of contribution values from the plurality of contributor nodes;
means for receiving a plurality of commitment values from the contributor nodes, wherein each commitment value is a function of a corresponding contribution value generated at each of the contributor nodes;
means for distributing the plurality of commitment values among the contributor nodes;
means for receiving the plurality of contribution values and corresponding verification signatures in response to distributing the plurality of commitment values, wherein each verification signature is a function of the plurality of commitment values and wherein the contribution values received from the contributor nodes are for generating the node identifier of the joining node; and
means for sending the plurality of contribution values to the joining node.

52. The device of claim 51, wherein each verification signature binds the commitment values to one another, and also binds the contributions to one another, prior to each contributor node disclosing its contribution value to at least one other node.

53. The device of claim 51, further comprising:
means for verifying the commitment values and verification signatures prior to sending the contribution values to the joining node.

54. A processor, comprising:
a first circuit to receive a join request from a joining node seeking to obtain a plurality of contribution values from a plurality of contributor nodes within an overlay network for use in generating a node identifier of the joining node from within an identifier space for the overlay network;
a second circuit to send a plurality of contribution requests to the plurality of contributor nodes in the overlay network;
a third circuit to receive a plurality of commitment values from the contributor nodes, wherein each commitment value is a function of a corresponding contribution value generated at each of the contributor nodes;
a fourth circuit to distribute the plurality of commitment values to the contributor nodes;
a fifth circuit to receive the plurality of contribution values and corresponding verification signatures in response to distributing the plurality of commitment values, wherein each verification signature is a function of the plurality of commitment values and wherein the contribution values received from the contributor nodes are for generating the node identifier of the joining node; and
a sixth circuit to send the plurality of contribution values to the joining node.

55. A non-transitory machine-readable medium comprising instructions operational in a node for assisting a joining node in generating a node identifier for a peer-to-peer overlay network, which when executed by one or more processors causes the processors to:
receive a join request from a joining node seeking to obtain one or more contribution values from a plurality of contributor nodes within the overlay network for use in generating the node identifier for the joining node from within an identifier space for the overlay network;
send a plurality of contribution requests to the plurality of contributor nodes in the overlay network;
receive a plurality of commitment values from the contributor nodes, wherein each commitment value is a function of a corresponding contribution value generated at each of the contributor nodes;
distribute the plurality of commitment values to the contributor nodes;
receive the plurality of contribution values and corresponding verification signatures in response to distributing the plurality of commitment values, wherein each verification signature is a function of the plurality of commitment values and wherein the contribution values received from the contributor nodes are for generating the node identifier of the joining node; and
send the plurality of contribution values to the joining node.

56. A method operational on a contributor node for assisting a joining node in generating a node identifier of the joining node for use in a peer-to-peer overlay network, comprising:
receiving a contribution request for a contribution value for use in generating the node identifier of the joining node, the contribution request including a hashed initial contribution value from the joining node;
generating a first contribution value at the contributor node for use in generating the node identifier of the joining node;
generating a commitment value from the first contribution value;
sending the commitment value to at least one other contributor node from among a plurality of contributor nodes;
receiving other commitment values from the at least one other contributor node;
generating a verification signature based on the received commitment values and the hashed initial contribution value; and
sending the first contribution value and the verification signature to the joining node after receiving the other commitment values.

57. The method of claim 56, wherein the first contribution value includes one or more of a random and a pseudorandom value.

58. The method of claim 56, wherein the verification signature binds the commitment values and the hashed initial contribution value, thereby allowing other nodes to subsequently verify the authenticity of the node identifier.

59. The method of claim 56, wherein the commitment value is first sent to an introducer node that collects the commitment values and then distributes them to the contributor node.

60. A contributor node device, comprising:
a network communication interface for communicating with a peer-to-peer overlay network;
a processing circuit coupled to the network communication interface, the processing circuit configured to:
receive a contribution request for a contribution value for use in generating a node identifier of a joining node, the contribution request including a hashed initial contribution value from a joining node;
generate a first contribution value at the contributor node device for use in generating the node identifier of the joining node;
generate a commitment value from the first contribution value;
send the commitment value to at least one other contributor node from among a plurality of contributor nodes;
receive other commitment values from the at least one other contributor node;
generate a verification signature based on the received commitment values and the hashed initial contribution value; and
send the first contribution value and the verification signature to the joining node after receiving the other commitment values.

61. The device of claim 60, wherein the verification signature binds the commitment values and the hashed initial contribution value, thereby allowing other nodes to subsequently verify the authenticity of the node identifier.

62. A contributor node device, comprising:
means for receiving a contribution request for a contribution value for use in generating a node identifier of a joining node, the contribution request including a hashed initial contribution value from a joining node;
means for generating a first contribution value at the contributor node device for use in generating the node identifier of the joining node;
means for generating a commitment value from the first contribution value;

means for sending the commitment value to at least one other contributor node among a plurality of contributor nodes within a peer-to-peer overlay network;

means for receiving other commitment values from the at least one other contributor node;

means for generating a verification signature based on the received commitment values and the hashed initial contribution value; and means for sending the first contribution value and the verification signature to the joining node after receiving the other commitment values.

63. A processor, comprising:

a first circuit to receive a contribution request for a contribution value for use in generating a node identifier of a joining node, the contribution request including a hashed initial contribution value from the joining node;

a second circuit to generate a first contribution value at a contributor node for use in generating the node identifier of the joining node;

a third circuit to generate a commitment value from the first contribution value;

a fourth circuit to send the commitment value to at least one other contributor node among a plurality of contributor nodes within a peer-to-peer overlay network;

a fifth circuit to receive other commitment values from the at least one other contributor node;

a sixth circuit to generate a verification signature based on the received commitment values and the hashed initial contribution value; and a seventh circuit to send the first contribution value and the verification signature to the joining node after receiving the other commitment values.

64. A non-transitory machine-readable medium comprising instructions operational in a contributor node for assisting a joining node in generating a node identifier for a peer-to-peer overlay network, which when executed by one or more processors causes the processors to:

receive a contribution request for a contribution value for use in generating the node identifier of the joining node, the contribution request including a hashed initial contribution value from a joining node;

generate a first contribution value at the contributor node;

generate a commitment value from the first contribution value for use in generating the node identifier of the joining node;

send the commitment value to at least one other contributor node among a plurality of contributor nodes within the peer-to-peer overlay network;

receive other commitment values from the at least one other contributor node;

generate a verification signature based on the received commitment values and the hashed initial contribution value; and send the first contribution value and the verification signature to the joining node after receiving the other commitment values.

* * * * *